United States Patent
Lange

(10) Patent No.: US 8,359,141 B1
(45) Date of Patent: Jan. 22, 2013

(54) CALIBRATED FARMING SYSTEM

(75) Inventor: Arthur F. Lange, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 12/927,427

(22) Filed: Nov. 15, 2010

Related U.S. Application Data

(63) Continuation of application No. 11/148,870, filed on Jun. 9, 2005, now Pat. No. 7,860,628.

(51) Int. Cl.
    *A01B 69/00* (2006.01)

(52) U.S. Cl. ............ 701/50; 561/10.2 R; 561/10.2 A; 561/10.2 F; 172/2; 172/282; 172/283; 172/313; 172/439; 340/995.1; 701/23; 701/63; 701/41; 701/400; 701/408; 701/431; 701/442; 701/466; 701/467; 701/468

(58) Field of Classification Search ........... 701/400–472
    See application file for complete search history.

(56) References Cited

U.S. PATENT DOCUMENTS

| | | | |
|---|---|---|---|
| D305,338 S | 1/1990 | Baillie | |
| 5,170,849 A | 12/1992 | Nikkel et al. | 172/6 |
| 5,255,756 A * | 10/1993 | Follmer et al. | 180/401 |
| 5,471,391 A | 11/1995 | Gudat et al. | 364/424.07 |
| 5,509,486 A * | 4/1996 | Anderson | 172/6 |
| 5,549,166 A * | 8/1996 | Orbach et al. | 172/4 |
| 5,592,382 A * | 1/1997 | Colley | 701/467 |
| 5,786,789 A | 7/1998 | Janky | |
| 5,915,313 A | 6/1999 | Bender et al. | |
| 5,928,309 A | 7/1999 | Korver et al. | |
| 5,955,973 A | 9/1999 | Anderson | |
| 5,974,348 A | 10/1999 | Rocks | 701/28 |
| 5,991,694 A * | 11/1999 | Gudat et al. | 702/2 |
| 5,995,902 A * | 11/1999 | Monson | 701/468 |
| 6,052,647 A | 4/2000 | Parkinson et al. | 701/23 |
| 6,070,539 A | 6/2000 | Flamme et al. | |
| 6,070,673 A | 6/2000 | Wendte | 172/2 |
| 6,073,070 A | 6/2000 | Diekhans | 701/50 |
| 6,087,984 A | 7/2000 | Keller et al. | |
| 6,088,644 A | 7/2000 | Brandt et al. | 701/50 |
| 6,104,339 A | 8/2000 | Nichols | 342/357.06 |
| 6,131,062 A | 10/2000 | Nielsen | |
| 6,185,492 B1 | 2/2001 | Kagawa et al. | |
| 6,199,000 B1 * | 3/2001 | Keller et al. | 701/50 |
| 6,272,405 B1 | 8/2001 | Kubota | 701/23 |
| 6,336,066 B1 | 1/2002 | Pellenc et al. | 701/50 |
| 6,377,889 B1 | 4/2002 | Soest | 701/207 |
| 6,434,462 B1 | 8/2002 | Bevly et al. | 701/50 |
| 6,445,983 B1 * | 9/2002 | Dickson et al. | 701/23 |

(Continued)

FOREIGN PATENT DOCUMENTS

AU 2004320401 B2 12/2005

(Continued)

OTHER PUBLICATIONS

USPTO action papers mailed Sep. 17, 2010 for U.S. Appl. No. 11/148,870, 8 pages.

(Continued)

*Primary Examiner* — Jonathan M Dager
(74) *Attorney, Agent, or Firm* — David R. Gildea

(57) ABSTRACT

An apparatus, method and tangible medium using row sensing for calibrating geographical positions for guiding a farm implement and calibrated geographical positions for steering a vehicle along a row.

21 Claims, 14 Drawing Sheets

U.S. PATENT DOCUMENTS

| | | | |
|---|---|---|---|
| 6,470,265 B1 | 10/2002 | Tanaka | 701/208 |
| 6,490,539 B1* | 12/2002 | Dickson et al. | 702/150 |
| 6,501,422 B1 | 12/2002 | Nichols | 342/357.17 |
| 6,522,948 B1* | 2/2003 | Benneweis | 700/243 |
| 6,539,303 B2* | 3/2003 | McClure et al. | 701/25 |
| 6,553,299 B1 | 4/2003 | Keller | 701/50 |
| 6,553,311 B2 | 4/2003 | Ahearn | 701/213 |
| 6,553,312 B2 | 4/2003 | Upadhyaya et al. | 701/213 |
| 6,553,925 B1* | 4/2003 | Beaujot | 111/14 |
| 6,567,747 B1* | 5/2003 | Lange et al. | 701/487 |
| 6,694,260 B1 | 2/2004 | Rekow | 701/466 |
| 6,703,973 B1* | 3/2004 | Nichols | 342/357.36 |
| 6,711,501 B2* | 3/2004 | McClure et al. | 701/23 |
| 6,721,453 B1* | 4/2004 | Benson et al. | 382/199 |
| 6,728,607 B1* | 4/2004 | Anderson | 701/25 |
| 6,789,014 B1 | 9/2004 | Rekow et al. | 701/25 |
| 6,804,587 B1* | 10/2004 | O Connor et al. | 701/26 |
| 6,865,465 B2 | 3/2005 | McClure | 701/50 |
| 6,876,920 B1* | 4/2005 | Mailer | 701/470 |
| 6,934,615 B2* | 8/2005 | Flann et al. | 701/50 |
| 6,990,399 B2 | 1/2006 | Hrazdera et al. | |
| 7,054,731 B1 | 5/2006 | Lange et al. | |
| 7,143,980 B2 | 12/2006 | Heller et al. | |
| 7,162,348 B2 | 1/2007 | McClure et al. | 701/50 |
| 7,188,015 B2 | 3/2007 | Lange et al. | |
| 7,212,938 B2 | 5/2007 | Mai | |
| 7,225,060 B2 | 5/2007 | O'Connor et al. | 701/1 |
| 7,228,214 B2 | 6/2007 | Flann et al. | |
| 7,263,422 B2 | 8/2007 | Lange et al. | |
| 7,383,114 B1 | 6/2008 | Lange et al. | 701/50 |
| 7,395,769 B2* | 7/2008 | Jensen | 111/121 |
| 7,437,230 B2 | 10/2008 | McClure et al. | 701/50 |
| 7,460,942 B2* | 12/2008 | Mailer | 701/50 |
| 7,721,830 B2* | 5/2010 | Dunn et al. | 180/6.48 |
| 7,729,853 B2* | 6/2010 | Price et al. | 701/457 |
| 7,835,832 B2* | 11/2010 | Macdonald et al. | 701/24 |
| 7,844,378 B2 | 11/2010 | Lange | 701/50 |
| 8,019,506 B2* | 9/2011 | Markiton et al. | 701/41 |
| 2002/0022927 A1 | 2/2002 | Lemelson et al. | 701/301 |
| 2002/0072850 A1* | 6/2002 | McClure et al. | 701/213 |
| 2002/0072851 A1* | 6/2002 | Ahearn et al. | 701/213 |
| 2002/0165649 A1* | 11/2002 | Wilhelm Rekow et al. | 701/26 |
| 2002/0198654 A1* | 12/2002 | Lange et al. | 701/213 |
| 2003/0187560 A1* | 10/2003 | Keller et al. | 701/50 |
| 2003/0187577 A1* | 10/2003 | McClure et al. | 701/213 |
| 2003/0208311 A1* | 11/2003 | McClure | 701/50 |
| 2004/0111202 A1* | 6/2004 | Mailer | 701/50 |
| 2004/0124605 A1* | 7/2004 | McClure et al. | 280/456.1 |
| 2004/0186644 A1* | 9/2004 | McClure et al. | 701/50 |
| 2004/0210357 A1 | 10/2004 | McKay et al. | 701/23 |
| 2005/0015189 A1* | 1/2005 | Posselius et al. | 701/50 |
| 2005/0075785 A1* | 4/2005 | Gray et al. | 701/202 |
| 2005/0131640 A1* | 6/2005 | Price et al. | 701/209 |
| 2005/0171684 A1* | 8/2005 | Turner | 701/200 |
| 2005/0171693 A1* | 8/2005 | Lange et al. | 701/209 |
| 2006/0025894 A1 | 2/2006 | O'Connor et al. | 701/1 |
| 2006/0116798 A1* | 6/2006 | Gibson et al. | 701/26 |
| 2006/0142936 A1* | 6/2006 | Dix | 701/200 |
| 2006/0178825 A1* | 8/2006 | Eglington et al. | 701/211 |
| 2006/0195238 A1* | 8/2006 | Gibson et al. | 701/23 |
| 2006/0200294 A1 | 9/2006 | Scheufler et al. | 701/50 |
| 2006/0237200 A1* | 10/2006 | Unruh et al. | 172/2 |
| 2006/0271348 A1 | 11/2006 | Rossow et al. | 703/26 |
| 2006/0282205 A1 | 12/2006 | Lange | 701/50 |
| 2007/0175198 A1* | 8/2007 | Viaud et al. | 56/341 |
| 2008/0039991 A1 | 2/2008 | May et al. | 701/25 |
| 2008/0086249 A1 | 4/2008 | Lange | 701/41 |
| 2010/0017075 A1* | 1/2010 | Beaujot | 701/50 |

FOREIGN PATENT DOCUMENTS

| | | |
|---|---|---|
| EP | 1758687 A1 | 2/2007 |
| EP | 2029969 A2 | 3/2009 |
| WO | WO 02/080652 A1 | 10/2002 |
| WO | WO 2005/119386 A1 | 12/2005 |
| WO | WO 2006002360 A1 | 1/2006 |
| WO | WO 2007084965 A3 | 7/2007 |
| WO | WO 2007145703 A2 | 12/2007 |

OTHER PUBLICATIONS

USPTO action papers mailed Sep. 30, 2010 for U.S. Appl. No. 11/148,870, 13 pages.

Orthman Manufacturing, Inc., Lexington, Nebraska, "Home | Orthman Ag Products | Industrial Products | Industrial Products | New Product Announcements | Farm Show Schedule | Dealership Locator | Literature Room | Dealer Communications | Tech Service | Company e-mail", 34 pages from www.orthman.com on Jul. 15-19, 2003.

Sukup Manufacturing Company, Sheffield, Iowa, "Sukup Locations Distributions Centers, From Planting to Harvest Sukup Fills Your Bin With Quality, Field Equipment, Guidance Systems, Flail Shredders, Guidance Sensing Options", 15 pages from www.sukup.com, Jul. 15-19, 2003.

A GPS-Reflections Receiver That Computes Doppler/Delay Maps in Real Time; Nogues-Correig. O.; Cardellach Gali, E.; Sanz Campderros, J.; Rius, A.; Geoscience and Remote Sensing, IEEE Transactions on; vol. 45. Issue 1, Jan. 2007 pp. 156-174; Digital Object Identifier 10.1109/TGRS.2006.882257.

Broadband communications via high-altitude platforms: a survey; Karapantazis. S.; Pavlidou, F.; Communications Surveys & Tutorials. IEEE; vol. 7, Issue 1, First Qtr. 2005 pp. 2-31.

The Sentinel-3 mission and its topography element; Mavrocordatos, C.; Berruti, B.; Aguirre, M.; Drinkwater, M.; Geoscience and Remote Sensing Symposium. 2007. IGARSS 2007. IEEE International; Jul. 23-28, 2007 pp. 3529-3532 Digital Object Identifier 10.1109/IGARSS.2007.4423607.

TanDEM-X: A Satellite Formation for High-Resolution SAR Interferometry; Krieger, G.; Moreira, A.; Fiedler, H.; Hajnsek I.; Werner. M.; Younis. M.; Zink. M.; Geoscience and Remote Sensing, IEEE Transactions on; vol. 45, Issue 11. Part 1, Nov. 2007 pp. 3317-3341; Digital Object Identifier 10.1109/TGRS.2007.900693.

Application and analysis of a robust trajectory tracking controller for under-characterized autonomous vehicles; Wise, M. et al.; Control Applications, 2008, CCA 2008. IEEE International Conference on; Digital Object Identifier. 10.1109/CCA.2008.4829651 Publication Year: 2008, pp. 274-280.

Path Error Measurement and Compensation of Precision Working Table; Cao Jun et al.; mechatronics and Machine Vision in Practice, 2008. M2VIP 2008. 15th International Conference on; Digital Object Identifier: 10.1109/MMVIP.2008.4749572 Publication Year: 2008, pp. 429-434.

Polarimetric Features of Oyster Farm Observed by AIRSAR and JERS-1; Seung-Kuk Lee et al.; Geoscience and Remote Sensing, IEEE Transactions on; vol. 44, Issue: 10, Part 1; Digital Object Identifier. 10.1109/TGRS.2006.879107 Publication Year: 2006. pp. 2728-2735.

The phase compensation scheme for multiple planar antenna on the SOTM; Qiong Wang et al.; Industrial Electronics and Applications, 2009. ICIEA 2009. 4th IEEE Conference on; Digital Object Identifier. 10.1109/ICIEA.2009.5138511 Publication Year: 2009, pp. 1815-1818.

USPTO action papers mailed May 19, 2005 for U.S. Appl. No. 10/652,454, 13 pages.

USPTO action papers mailed Aug. 25, 2005 for U.S. Appl. No. 10/652,454, 13 pages.

USPTO action papers mailed Oct. 19, 2005 for U.S. Appl. No. 10/652,454, 3 pages.

USPTO action papers mailed Dec. 8, 2005 for U.S. Appl. No. 10/652,454, 2 pages.

USPTO action papers mailed Mar. 27, 2006 for U.S. Appl. No. 10/652,454, 4 pages.

USPTO action papers mailed Jan. 25, 2007 for U.S. Appl. No. 11/400,126, 10 pages.

USPTO action papers mailed May 21, 2007 for U.S. Appl. No. 11/400,126, 7 pages.

USPTO action papers mailed Jan. 9, 2008 for U.S. Appl. No. 11/400,126, 2 pages.

USPTO action papers mailed Apr. 1, 2008 for U.S. Appl. No. 11/400,126, 7 pages.

USPTO action papers mailed Jan. 10, 2007 for U.S. Appl. No. 11/148,870, 6 pages.

USPTO action papers mailed Jun. 8, 2007 for U.S. Appl. No. 11/148,870, 22 pages.
USPTO action papers mailed Oct. 5, 2007 for U.S. Appl. No. 11/148,870, 18 pages.
USPTO action papers mailed Dec. 13, 2007 for U.S. Appl. No. 11/148,870, 3 pages.
USPTO action papers mailed Feb. 27, 2008 for U.S. Appl. No. 11/148,870, 3 pages.
USPTO action papers mailed May 12, 2008 for U.S. Appl. No. 11/148,870, 31 pages.
USPTO action papers mailed Jan. 20, 2010 for U.S. Appl. No. 11/543,739.
USPTO action papers mailed May 27, 2010 for U.S. Appl. No. 11/543,739.
USPTO action papers mailed Jul. 9, 2010 for U.S. Appl. No. 11/543,739.
USPTO action papers mailed Aug. 23, 2010 for record display forms for U.S. Appl. No. 11/543,739, 14 pages.
GPS-aided INS based control state calculation for AHS; Yang, Y.; Farrell, J.; Tan, H.-S; American Control Conference. 2001. Proceedings of the 2001; vol. 3; Digital Object Identifier: 10.1109/ACC.2001.946098; Publication Year: 2001 , pp. 2321-2326 vol. 3.
A study on GPS integrity monitoring algorithms based on ultra-tight integration system; Li Fu; Yongquan Zhu; Industrial Electronics and Applications (ICIEA), 2011 6th IEEE Conference on; Digital Object Identifier: 10.1109/ICIEA.2011.5975655 Publication Year: 2011 , pp. 596-600.
GPS tracking of intermodal transportation: System integration with delivery order system; Heywood, C.; Connor, C.; Browning, D.; Smith, M.C.; Jianping Wang; Systems and Information Engineering Design Symposium. 2009. SIEDS '09; Digital Object Identifier: 10.1109/SIEDS.2009.5166179; Publication Year: 2009 , pp. 191-196.
The integration of GPS and interferometric Quantum Position System for high dynamic precise positioning: Chunyan Yang; Dewei Wu; Yonglin Yu; Information and Automation (ICIA), 2010 IEEE International Conference on; Digital Object Identifier: 10.1109/ICINFA.2010.5512389; Publication Year: 2010 , pp. 508-512.
USPTO action papers mailed Jun. 12, 2012 for U.S. Appl. No. 12/803,773, 23 pages.
G. O. Harries & B. Ambler, "Automatic Ploughing: A Tractor Guidance System Using Opto-electronic Remote Sensing Techniques and a Microprocessor Based Controller", Proc. agric. Engng. Res. (1981) 26, 33-53, British Society for Research in Agricultural Engineering © 1981, pp. 33-53.
TRI-R Innovations, Inc., Gibson City, IL, 26 pictures for Robotic Driver Model IV, filed Dec. 7, 2010.

* cited by examiner

CALIBRATED FARMING SYSTEM

CROSS REFERENCE TO RELATED APPLICATIONS

This application is a continuation of application Ser. No. 11/148,870 by Lange filed Jun. 9, 2005 now U.S. Pat. No. 7,860,628 and assigned to the same assignee.

BACKGROUND

1. Field

The present disclosure relates generally to systems for guiding farm implements.

2. Description of the Prior Art

Several companies have developed farm guidance systems for close cultivation of crops. These systems are used to reduce the amount of herbicide that is needed to keep weeds out of the growing area. One such system uses a special form of three-point hitch that is allowed to move side-to-side to track drag wires or guide wheels which follow a row of plants. However, a limitation of the wire and wheel systems occurs when planting because there are no crops in the ground for the wires to follow and often there are no raised rows for the guide wheels. Recently many farmers have began using "no-till" operations on their fields. With no-till, the field will never have furrows for a guidance system.

Recent developments with the global position system (GPS) using real time kinematic (RTK) carrier phase or differential (DGPS) corrections have made it possible for farmers to map geographical locations within a field and then return to those locations with the accuracy that is required for cultivating and planting. Several farm guidance systems have been developed or proposed using RTK or DGPS based locations with an autopilot for steering a tractor.

However, there are limitations of existing GPS-based tractor autopilot guidance systems. First, most existing GPS-based autopilot systems operate by determining a GPS-based cross track error of the tractor and then applying a position correction to determine and correct the cross track error of the implement. Errors in the position correction can undermine the fundamental accuracy of the GPS system. More importantly, when a three-point hitch is used, the control system equations for the correction are complicated by the tendency of the implement to displace to the side opposite the direction that the tractor is steered as the tractor and implement pivot about the rear wheels of the tractor. This difficulty could be avoided with a pivoting hitch. However, the position correction would also need to track the pivot angles. Even if the position corrections could track the pivot angles, the implement would be difficult to use on a sideways sloping terrain.

Second, the weight and size of a tractor result in a slow response time for positioning a towed implement. However, it is desirable to have a fast response in order to propel the implement as fast as possible for a given acceptable cross track error.

Third, GPS-based autopilot systems are limited in a practical sense because there are a great variety of different models of tractors that have different steering requirements. Many of these tractors are very old or have steering systems that are very difficult to connect to a guidance system. Often an older tractor will require the design of a custom hydraulic controller for the tractor's power steering. The documentation for the tractor's steering system may not be available. After all costs are included the custom design may well cost more than the cost of a new tractor.

There is a need for a farming guidance system for dynamic lateral positioning of a farm implement along a geographical path where the system has a fast response time, does not require a position correction between the tractor and the implement, and does not rely on existing rows.

SUMMARY

Briefly, the present disclosure shows a global positioning system (GPS) antenna mounting directly on a farm implement for receiving GPS signals; a GPS receiver coupled to the GPS antenna for determining a location of the GPS antenna; and a dual guidance computer for comparing the location to stored geographical coordinates of a desired path. The dual guidance computer provides a guide signal for offsetting the lateral position of an adjustable hitch or turning a steering angle within the implement for guiding the implement along the path; and a range extent signal for maintaining the offset or steering angle within its dynamic range.

In one embodiment, an adjustable hitch connects the implement to a powered vehicle, such as a tractor, for towing or pushing the implement. The dual guidance computer provides a lateral or left-right guide signal for rapidly positioning the implement side-to-side with respect to the powered vehicle. The dual guidance computer also provides a range extent signal for the position offset of the hitch with respect to the dynamic range of the position offset. A pilot device in the powered vehicle uses the range extent signal for steering the powered vehicle with a relatively slow response for maintaining the position offset of the adjustable hitch within its left-right dynamic range. The pilot device may be an autopilot or a left-right position offset display used by a human operator of the powered vehicle.

In prior art, when the implement is directly and firmly attached to the tractor with a three-point hitch, the tractor has to be steered and moved so the implement is then dragged to the proper line, often resulting in a large delay in bringing the implement back on-line with the possibility of oversteering of the tractor and less accurate positioning of the implement. As described below in one embodiment, when a tractor is driving along pushing or towing an implement, and an off-line position error is detected, the implement can be quickly be brought on-line by moving the hitch with respect to the tractor.

In one embodiment, a pivoting hitch connects the implement to the powered vehicle. The dual guidance computer provides a left-right guide signal to a steering device in the implement. The steering device may be a coulter having an adjustable angle acting as a rudder in the ground. The steering device uses the guide signal for adjusting its angle with respect to a center line of the implement. The dual guidance computer also provides a range extent signal to the pilot device for the angle of the steering device with respect to the maximum extent of the angle. The pilot device uses the range extent signal for steering the powered vehicle with a relatively slow response for maintaining the angle of the steering device in the implement within its maximum extent.

Embodiments described herein have several advantages over the existing art for guiding a farm implement along a path. For example, existing rows may not be needed because GPS is used to determine geographical locations. A position correction between the powered vehicle and the farm implement may not be needed because the GPS signals are received directly on the farm implement. It may not be necessary to add or interface an autopilot for an existing powered vehicle. The farm implement might be propelled along a precise path at a relatively rapid rate without a requirement for fast steering of the powered vehicle. These advantages are especially beneficial for guiding the implement along a turn path from one swath to another.

In one embodiment, a farming apparatus guides an implement in a turn between swaths includes: a GPS receiver for determining a GPS position for a farm implement propelled by a powered vehicle; and a turn computer including a turn path calculator for determining a turn path based on an end position of a first swath and a start position of a second swath; a GPS cross track error (XTE) calculator for comparing the GPS position to the turn path for providing a GPS XTE, the GPS XTE for steering the vehicle along the turn path. The turn computer may also include a GPS-row calibrator for calibrating the GPS position with the swath end position for providing a calibrated GPS position, the GPS XTE calculator using the calibrated GPS position as the GPS position for providing the GPS XTE.

In one embodiment, a farming method for guiding an implement in a turn between swaths includes steps of determining a GPS position for a farm implement propelled by a powered vehicle; determining a turn path based on an end position of a first swath and a start position of a second swath; comparing the GPS position to the turn path for providing a GPS cross track error (XTE); and steering the vehicle along the turn path according to the GPS XTE. The method may also include a step of calibrating the GPS position with the swath end position for providing a calibrated GPS position; and using the calibrated GPS position as the GPS position for providing the GPS XTE.

In one embodiment, a tangible medium contains a set of instructions for causing a processor to carry out the following steps for guiding a farm implement propelled by a powered vehicle in a turn between swaths: determining a GPS position for a farm implement propelled by a powered vehicle; determining a turn path based on an end position of a first swath and a start position of a second swath; comparing the GPS position to the turn path for providing a GPS cross track error (XTE); and steering the vehicle along the turn path according to the GPS XTE. The medium may also contain instructions for calibrating the GPS position with the swath end position for providing a calibrated GPS position; and using the calibrated GPS position as the GPS position for providing the GPS XTE.

These and other embodiments will no doubt become obvious to those of ordinary skill in the art after having read the following detailed description and viewed the various figures.

IN THE DRAWINGS

DETAILED DESCRIPTION

Figure 1B:
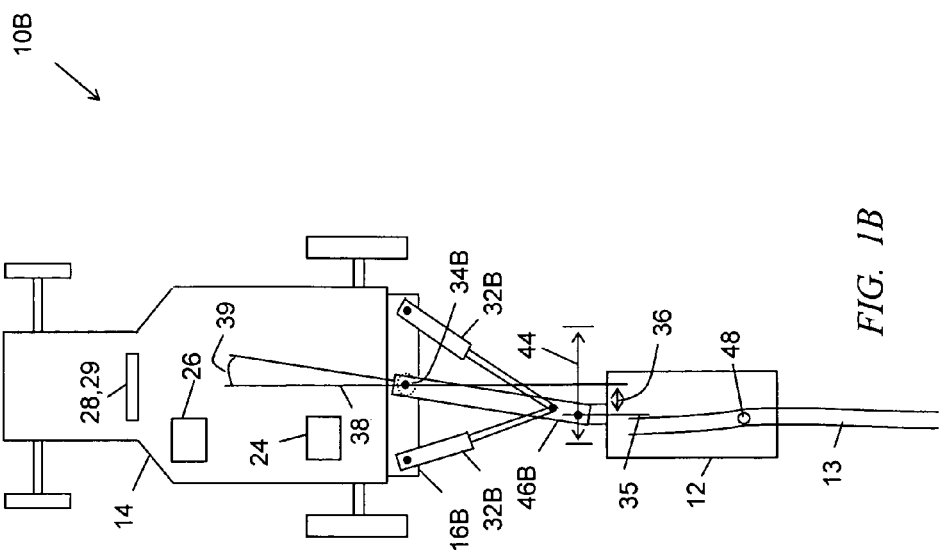
FIGS. 1A and 1B are illustrations showing first and second embodiments for guiding a farm implement.
Figure 1A:
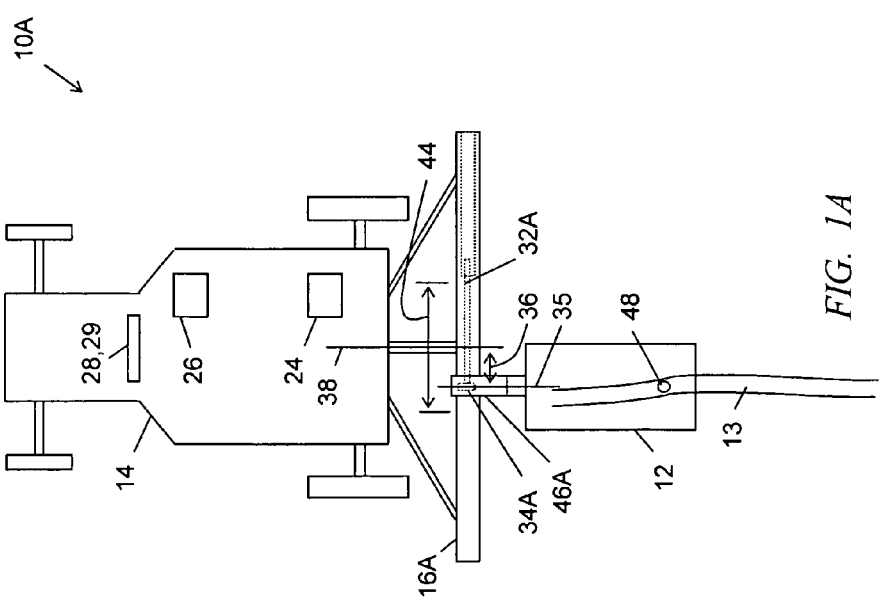

FIGS. 1A and 1B illustrate embodiments of a farming system referred to with reference numbers 10A and 10B, respectively. It is an object of the system 10A,B to guide a farm implement 12 along a path 13 by dynamically adjusting the lateral or left-right position of the implement 12 with respect to a powered vehicle 14 that propels (tows, pulls, or side carries) the implement 12. The implement 12 can be a cultivator, planter, seeder, ripper, or the like.

Referring to FIG. 1A, the system 10A includes the farm implement 12, the powered vehicle 14, an adjustable hitch 16A, a global positioning system (GPS) receiver 24, a dual guidance computer 26, and a vehicle pilot device 28 or 29. The hitch 16A physically connects the implement 12 to the vehicle 14.

The hitch 16A includes an actuator 32A and a sensor 34A. The implement 12 has a center line 35. The actuator 32A physically positions the implement center line 35 to an adjustable left-right position offset 36 from a center line 38 of the vehicle 14. The sensor 34A senses the position of the adjustable position offset 36 with respect to a maximum position offset range 44 and provides an offset sense signal. The actuator 32A may be a hydraulic device or two hydraulic devices for pushing and pulling on a sliding tongue 46A of the hitch 16A that is connected with a tongue of the implement 12. Alternatively, the tongue 46A can be a part of the implement 12.

The farm implement 12 includes a GPS antenna 48 for receiving GPS signals from GPS satellites or pseudolites. The GPS antenna 48 converts airwave GPS signals to conducted GPS signals and passes the conducted GPS signals to the GPS receiver 24. The GPS receiver 24 uses the conducted GPS signals for determining a GPS-based geographical location of the point on the farm implement 12 where GPS antenna 48 is fixed. The GPS receiver 24 typically includes a radio transceiver for receiving real time kinematic (RTK) or differential GPS correction information and an RTK or DGPS computer using the GPS signals and the correction information for improving the accuracy of the location. The GPS receiver 24 and/or the dual guidance computer 26 can be disposed in the vehicle 14, the hitch 16A or the implement 12.

Referring to FIG. 1B, the system 10B includes the farm implement 12, the powered vehicle 14, the global positioning system (GPS) receiver 24, the dual guidance computer 26, the vehicle pilot device 28 or 29, and an adjustable hitch 16B. The hitch 16B physically connects the implement 12 to the vehicle 14.

The hitch 16B includes actuators 32B and a sensor 34B. The actuators 32B physically position the implement center line 35 to the adjustable left-right position offset 36 from the vehicle center line 38. The sensor 34B senses an angle 39 between the vehicle center line 38 and a center line of the tongue 46B for providing the offset sense signal. Either the sensor 34B or the dual guidance computer 26 the uses the geometries of the hitch 16B and/or the implement 12 for determining the lateral position of the adjustable position offset 36 with respect to the maximum position offset range 44. The actuators 32B may be dual hydraulic devices for pushing and pulling the tongue 46B of the hitch 16B in order to adjust the angle of the tongue 46B with respect to the center line 38. The tongue 46B is pivotally connected at the hitch 16B and the implement 12. Alternatively, the tongue 46B can be a part of the implement 12. The GPS receiver 24 and/or the dual guidance computer 26 can be disposed in the vehicle 14, the hitch 16B or the implement 12.

Figure 2:
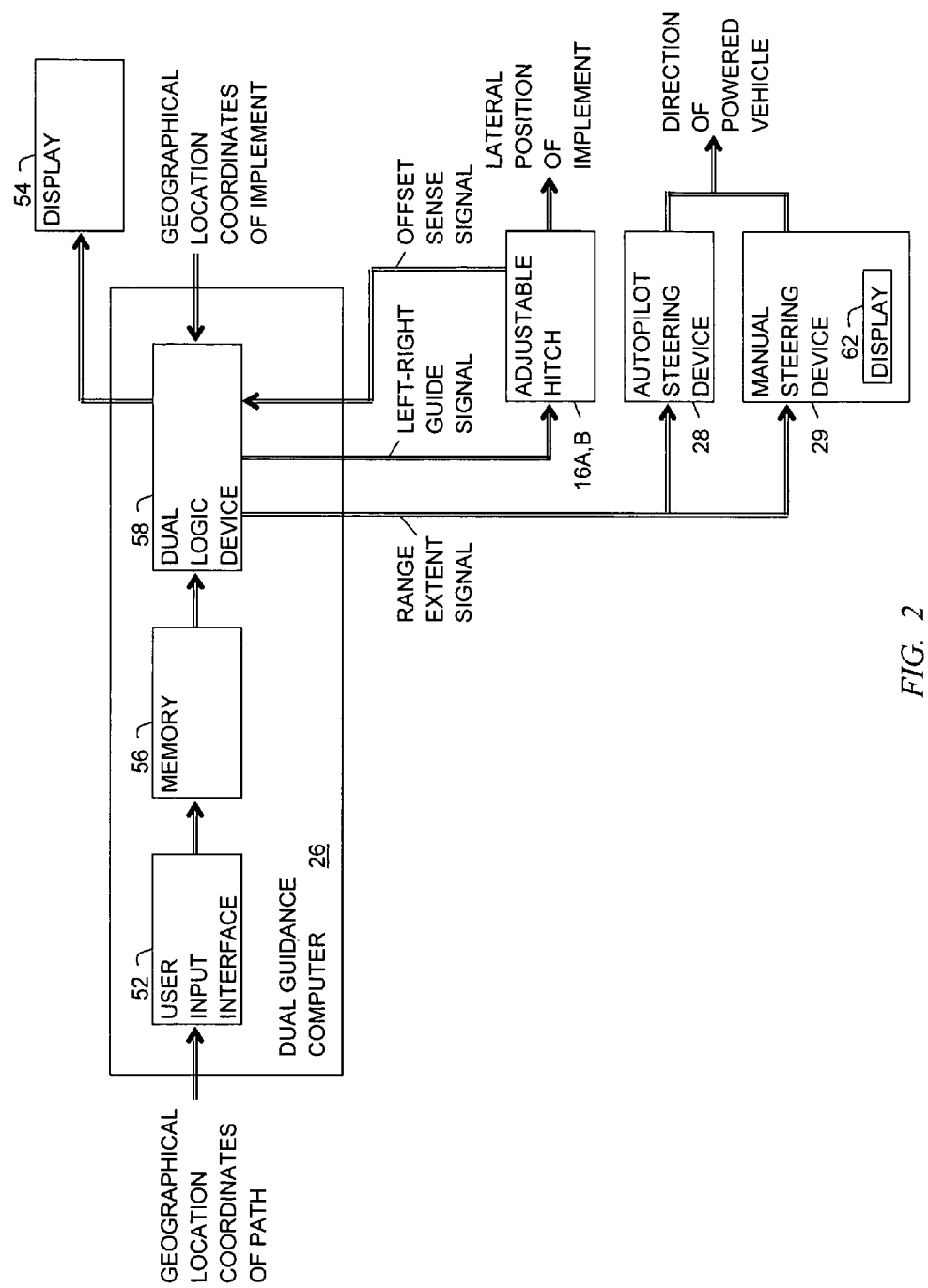
FIG. 2 is a block diagram of a dual guidance computer for the embodiments of FIGS. 1A-B.

FIG. 2 is a block diagram of the dual guidance computer 26. The dual guidance computer 26 has the two functions of providing a left-right guide signal for positioning the adjustable hitch 16A,B side to side at a relatively rapid rate and providing a range extent signal used for steering the powered vehicle 14 at a relatively slow rate.

The dual guidance computer 26 includes a user input interface 52, a display 54, a memory 56, and a dual logic device 58. The memory 56 receives geographical coordinate information through the user input interface 52 for the path 13. The dual logic device 58 reads the geographical information for the path 13 from the memory 56 and then compares the path 13 to the GPS-based location of the implement 12 for determining a cross track error. A correction for the cross track error is then issued by the dual logic device 58 as the left-right guide signal to the adjustable hitch 16A,B. The adjustable hitch 16A,B uses the left-right guide signal to drive the actuators 32A,B. When the vehicle 14 is towing, pushing or side carrying the implement 12, the action of feedback from the comparison between the path 13 and the location of the implement 12 is fed back in the form of the left-right guide signal to the actuators 32A,B in order to guide the implement 12 to follow the path 13 as long as the position offset 36 is within the position offset range 44.

The dual logic device 58 receives information for the position offset 36 in a form that is related to the position offset dynamic range 44 in the offset sense signal from the sensor 34A,B. For example, the position offset 36 may be represented by a voltage of plus five volts to minus five volts where plus five volts represents the maximum extent of the position offset 36 in one direction and minus five volts represents the maximum extent of the position offset 36 in the other direction. The dual logic device 58 passes the information for the position offset 36 with respect to the position offset range 44 as a range extent signal to the vehicle pilot device 28,29. The pilot device 28,29 is used to make coarse relatively slow corrections in direction for maintaining the position offset 36 within its dynamic range 44. The pilot device 28 is an automatic steering device (autopilot) for steering the vehicle 14. The pilot device 29 uses the display 54 for showing a visual illustration 62 (FIG. 3) of the position offset 36 with respect to the maximum extents of the position offset range 44. A human operator uses the visual pilot representation 62 for steering the vehicle 14.

Figure 3:
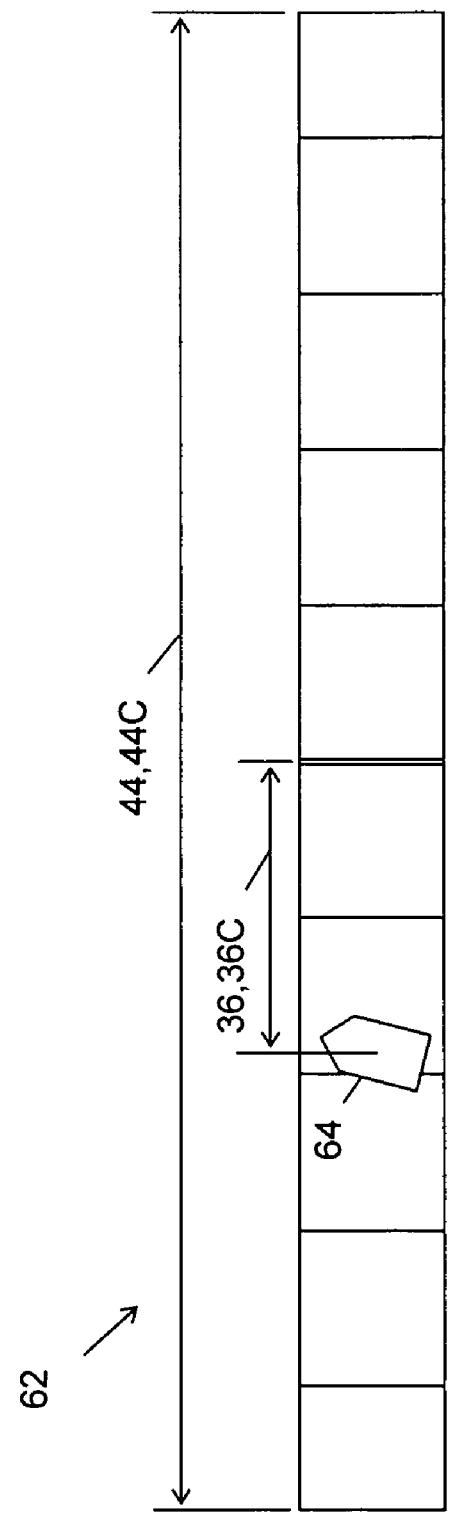
FIG. 3 is an illustration of a display for a steering device of the embodiments of FIGS. 1A-B, 4 and 7.
Figure 4:
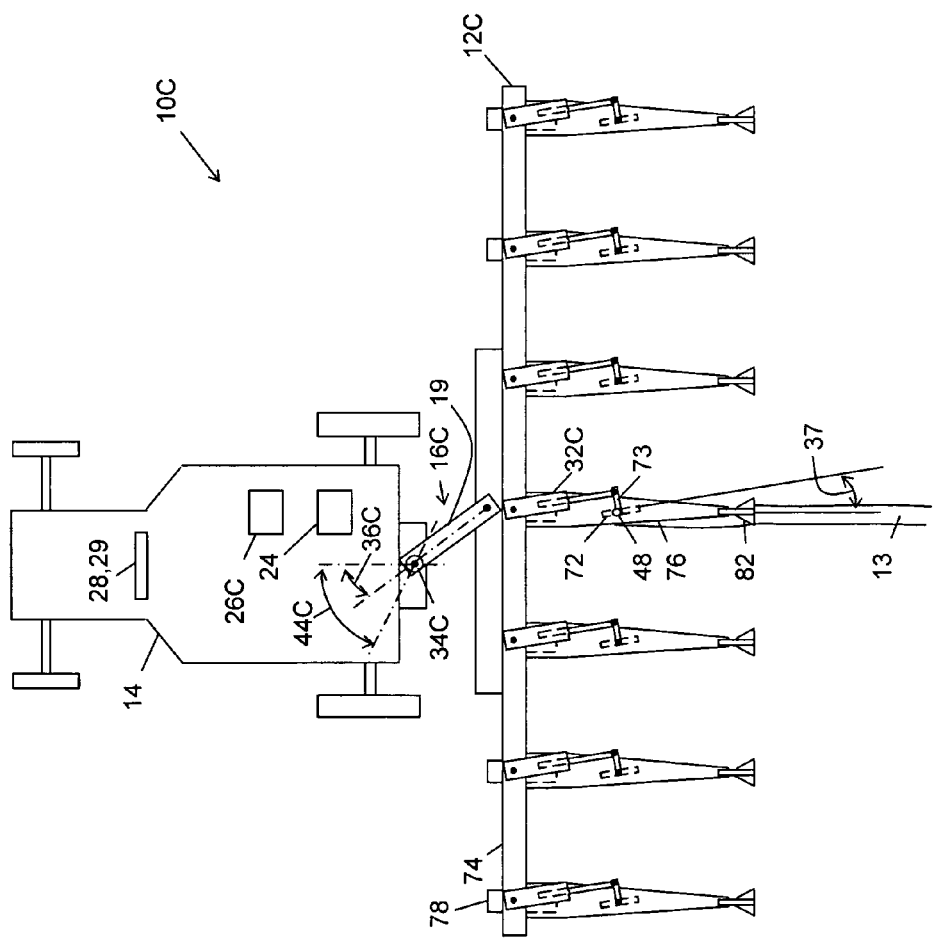
FIG. 4 is an illustration showing a third embodiment for guiding a farm implement.

FIG. 3 is a drawing of the visual pilot representation 62 for the vehicle pilot device 29. The visual pilot 62 shows the extent of the dynamic range 44 of the hitch 16A-B or maximum angle extent 44C of the implement 12C (FIG. 4); and an implement icon 64 showing the position offset 36 or steering angle 36C (FIG. 4). The visual pilot 62 also shows the direction of the implement 12 or 12C. The direction of the implement 12 or 12C may be determined by the GPS receiver 24 by measuring Doppler effects on the GPS signals received by the GPS antenna 48 or from successive GPS-based locations of the GPS antenna 48.

FIG. 4 illustrates an embodiment of a farming system referred to with a reference number 10C. It is an object of the system 10C to guide a steerable farm implement 12C along a path 13 by dynamically steering the implement 12C with respect to the powered vehicle 14 that propels (tows, pulls or side carries) the implement 12C.

The system 10C includes the farm implement 12C, the powered vehicle 14, a pivoting hitch 16C, the global positioning system (GPS) receiver 24, a dual guidance computer 26C, and the vehicle pilot device 28 or 29. The hitch 16C includes a pivoting arm 19 that physically connects the implement 12C to the vehicle 14. The arm 19 pivots to enable the implement 12C to use the left right guide signal to steer itself. Alternatively, the hitch 16C may include a lateral sliding mechanism enabling the implement 12C to position itself to the left or right of the vehicle 14.

The implement 12C includes one or more left-right steering devices 72 and one or more actuators 32C The actuators 32C use radius bars 73 to physically adjust a steering angle 37 of the steering devices 72 about a vertical axis in order to steer the implement 12C. The hitch 16C includes a sensor 34C for sensing a pivot angle 36C of the hitch 16C with respect to a maximum pivoting angle 44C for providing an angular offset sense signal. The sensor 34C senses the pivot angle 36C with respect to a maximum pivoting angle 44C for providing an angular offset sense signal. The implement 12C may be a cultivator and the steering devices 72 are coulters. The cultivator includes the coulters 72, a bar 74, chassis' 76, support wheels 78 and foot pieces 82. However, the implement 12C could equally well be a planter, seeder, harvester, picker, marker, ripper, or the like. When the steering devices 72 are coulters, the coulters act as rudders in the ground to steer the implement 12C in a manner that is analogous to the way that a rudder in the water steers a boat. However, the steering devices 72 can be support wheels, foot pieces, or other members that roll on or drag through the ground.

The farm implement 12C includes the GPS antenna 48 as described above for receiving GPS signals from GPS satellites or pseudolites. The GPS receiver 24 as described above uses the GPS signals received by the GPS antenna 48 for determining a GPS-based geographical location of the point on the farm implement 12C where GPS antenna 48 is fixed. The GPS receiver 24 and/or the dual guidance computer 26C can be disposed in the vehicle 14, the hitch 16C or the implement 12C.

The actuators 32A-C are illustrated and described in terms of hydraulic devices. However, it should be apparent to those skilled in the mechanical arts that the actuators 32A-C can also be implemented with other mechanical devices using motors, gears, chain drives, pulleys, wires, pneumatic devices, cranks, and the like. The sensor 34C can be a potentiometer for providing a variable resistance proportional to the angle 36C.

Figure 5:
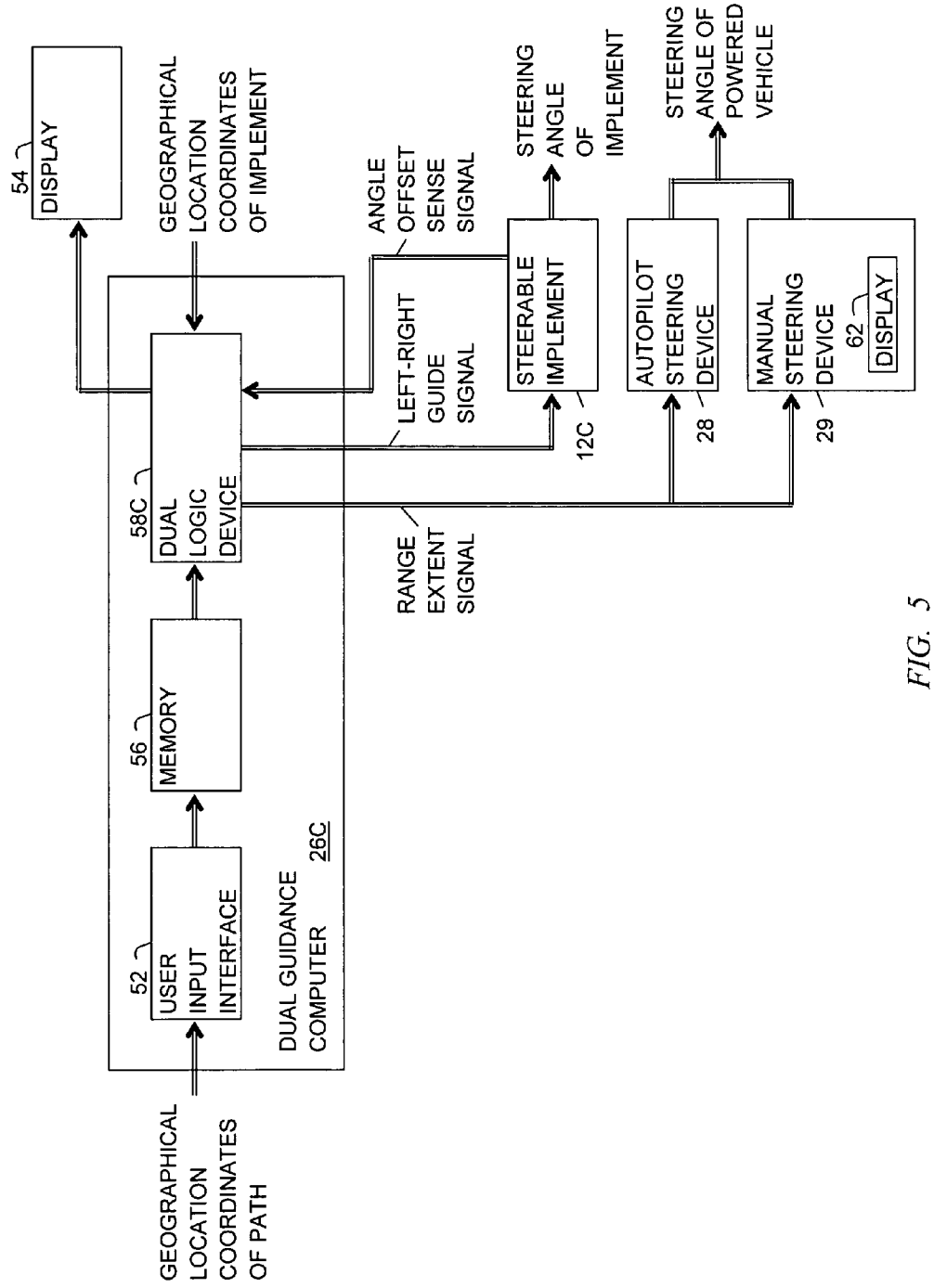
FIG. 5 is a block diagram of a dual guidance computer of the embodiment of FIG. 4.

FIG. 5 is a block diagram of the dual guidance computer 26C. The dual guidance computer 26C has the two functions of providing a left-right guide signal for steering the implement 16C side to side at a relatively rapid rate; and providing a range extent signal used for steering the powered vehicle 14 at a relatively slow rate.

The dual guidance computer 26C includes the user input interface 52, the display 54, the memory 56, and a dual logic device 58C. The memory 56 receives geographical coordinate information through the user input interface 52 for the path 13. The dual logic device 58C reads the geographical information for the path 13 from the memory 56 and then compares the path 13 to the GPS-based location of the implement 12C for determining a cross track error. A correction for the cross track error is then issued by the dual logic device 58C as the left-right guide signal to the steerable implement 16C. The steerable implement 16C uses the left-right guide signal to drive at least one of the actuators 32C. When the vehicle 14 is towing or pushing the implement 12C, the action of feedback from the comparison between the path 13 and the location of the implement 12C is fed back in the form of the left-right guide signal to the actuator(s) 32C in order to guide the implement 12C to follow the path 13 as long as the steering angle 36C is within the maximum steering angle 44C.

The dual logic device 58C receives information for the steering angle 36C in a form that is related to the maximum steering angle 44C in an angle offset sense signal. For example, the steering angle 36C may be represented by a voltage of plus five volts to minus five volts where plus five volts represents the maximum steering angle 44C in one direction and minus five volts represents the maximum extent of the maximum steering angle 44C in the other direction. The dual logic device 58C passes the information for the steering angle 36C with respect to the maximum steering angle 44C as the range extent signal to the pilot device 28,29. The pilot device 28,29 is used to make coarse relatively slow corrections in direction for maintaining the steering angle 36C within the dynamic range of the maximum steering angle 44C. The pilot device 28 is an automatic steering device (autopilot) for steering the vehicle 14. The pilot device 29 uses the display 54 for showing the visual pilot representation 62 of the steering angle 36C with respect to the maximum extents 44C of the of the steering angle. A human operator uses the visual pilot 62 for steering the vehicle 14.

Figure 6A:
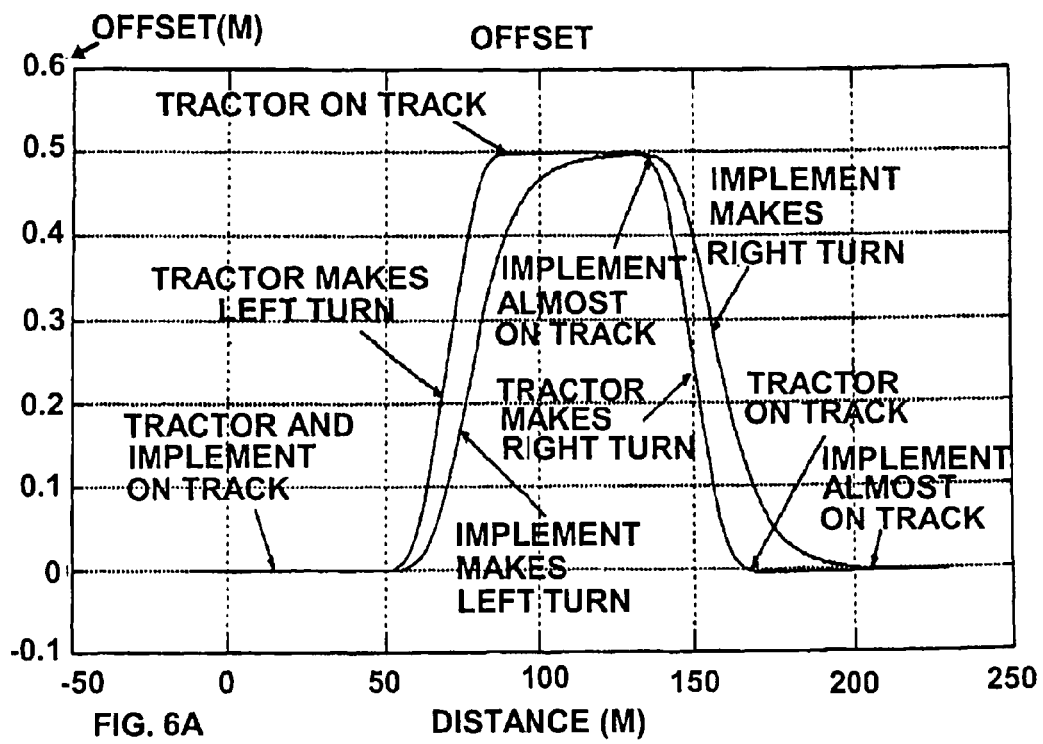
FIGS. 6A and 6B show offset and heading, respectively, for a farm implement guidance system of the prior art.
Figure 6B:
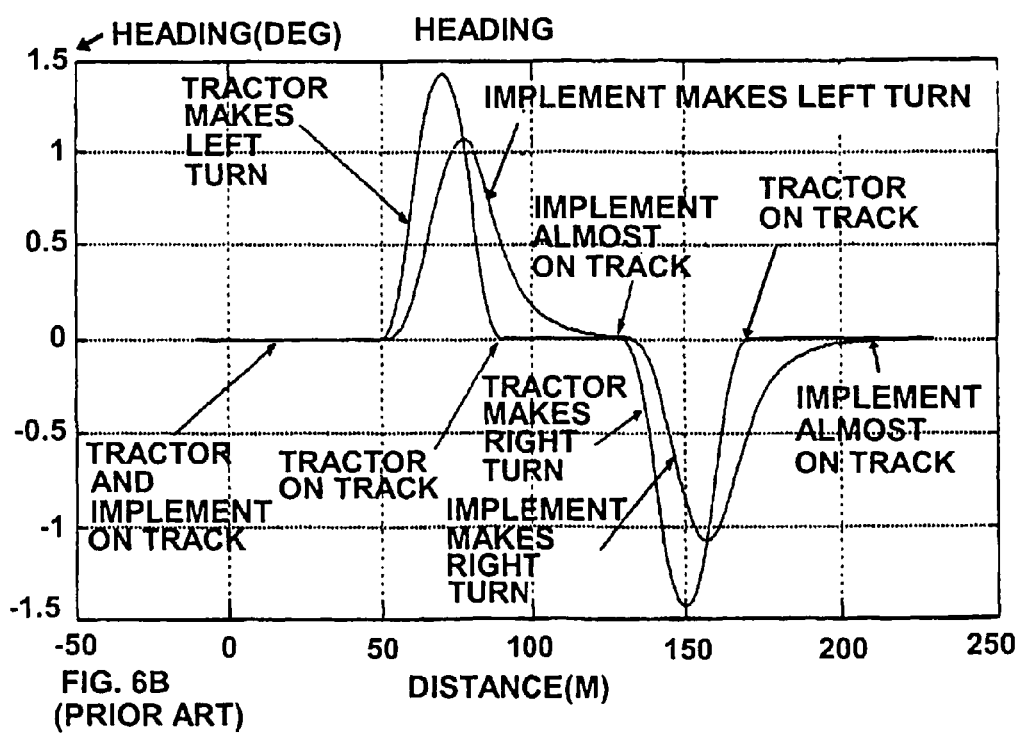

FIGS. 6A and 6B are offset and heading charts, respectively, showing simulated offset and heading for a farm implement guidance system of the prior art where a tractor is steered to position the implement (trailer). For the simulation, a boom length for the implement is chosen to be ten meters long attached to the rear axle of the tractor. Some implements may have shorter booms. However, a boom this long may be required for a wide implement. The tractor is assumed to have front steering and rear traction with a wheel base between front and rear axles of four meters. Two meters/second is used for the rear axle speed.

The tractor and implement travel on a track along an x-axis (horizontal axis on the offset and heading charts) from before 0 meters to after 200 meters. When the implement and the tractor have traveled about 50 meters, the tractor begins a left turn. The tractor settles to a cross track offset on the y-axis (vertical axis on the offset and heading charts) of 0.5 meters at about 90 meters on the x-axis (40 meters of travel distance after the left turn). The tractor stays at that cross track offset for about 40 meters. During this time, the implement is trailing the tractor. At about 130 meters the implement has still not fully settled. At that point, the tractor begins a right turn to come back to the original track at 0 meters on the y-axis. The tractor is fully on the original track at about 170 meters (again about 40 meters of travel distance after the turn). The implement again trails the tractor and settles at about 210 meters along the x-axis. The total distance for the tractor to settle for a lateral offset of 0.5 meters is about 40 meters=170 meters–130 meters or about 20 seconds at 2 meters/second. However, the total distance for the implement to settle is about 90 meters=210 meters–130 meters or about 45 seconds at 2 meters/second.

The farming system 10C includes the ground rudder or wheeled steerable implement 12C. Other things being equal, when the implement 12C itself is steered with comparable performance to the tractor of the prior art guidance system, the implement 12C would have settled as fast as the tractor at about 40 meters or 20 seconds at 2 meters/second. In other words the farming system 10C corrects the location of the implement 12C in about 40/90 or less than one-half the time or distance that is required by the prior art guidance system of steering the tractor.

The farming system 10A,B includes the lateral adjustment hitch 16A,B. In the above simulation the tractor wheels were turned left at a steady rate for 10 seconds, then back to straight-forward, then right, and then back to straightforward again. Each re-positioning of the tractor wheels takes 10 seconds. Other things being equal, if the hydraulics of the tractor can re-position the wheels in 10 seconds, the actuator 32A,B of the hitch 16A,B can re-position the implement 12A,B laterally in about the same time. Essentially in the prior art guidance system the driver of the tractor turns the tractor steering wheels to the left to start turning to the left. Then he straightens the wheels to the right initiating a right turn. Just before he gets onto the desired path, he steers to the left to straighten the tractor wheels. In the simulation, each of these actions take 1.0 seconds. Instead, if the tractor driver would command the actuator 32A,B of the hitch 16A,B, it would take about that much time to re-position the implement 12A,B. In other words, the farming system 10A,B corrects the location of the implement 16A,B in about 10/45 or less than one-quarter the time or distance that is required by the prior art guidance system of steering the tractor.

Figure 7:
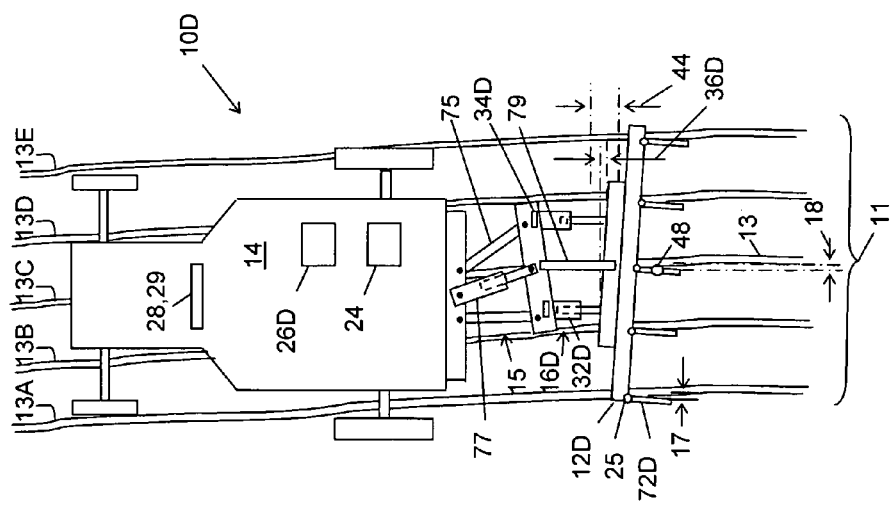
FIG. 7 is an illustration showing a fourth embodiment for guiding a farm implement.

FIG. 7 illustrates an embodiment of a farming system referred to with a reference number 10D. The system 10D includes a dual guidance computer 26D for steering a farm implement 12D along the path 13 and simultaneously steering a powered vehicle 14 (described above) for minimizing an offset of an adjustable steering hitch 16D.

The steering hitch 16D is controlled by an implement steering signal (analogous to the left-right guide signal described above) from the dual guidance computer 26D to steer the implement 12D to the left or to the right with respect to the direction of the powered vehicle 14 in order to follow the path 13. A pivoting vehicle hitch 15 connects the steering hitch 16D to the powered vehicle 14 and allows the steering hitch 16D to pivot left and right with respect to the vehicle 14. The pivoting hitch 15 itself need not be actively controlled. The implement 12D typically carries cultivator devices 72D for cultivating one or more rows, referenced as 13A, 13B, 13C, 13D and 13E, along the path 13. The rows 13A-E of the path 13 comprise a swath 11. The cultivator devices 72D may be coulters, planters, seeders, harvesters, pickers, markers, rippers, or the like.

The system 10D uses the GPS receiver 24 (described above) and/or one or more relative row position sensors 25 for determining relative positions. The GPS receiver 24 determines GPS positions of the GPS antenna 48 mounted on the implement 12D for providing the GPS positions of the implement 12D. The row position sensors 25 are carried on the implement 12D for sensing, row position offsets 17 between one or more rows 13A-E and the cultivators 72D.

Wands, acoustic (sonar) devices, or electromagnetic wave (radio or optical) devices may be used as the row position sensors 25. The wands physically sense rows by touching the earth and detecting the edges of the rows 13A-E. The acoustic, radio and optical devices include transmitters and receivers. The transmitters emit sonic, radio or optical signals, respectively. The receivers receive signals that are reflected from the earth at the edges of the rows 13A-E and translate the times between the transmitted and received signals into the distances of the row position offsets 17. The frequency of the optical devices may be in the infrared range. The row position sensors 25 issue row offset signals for the position offsets 17 to the dual guidance computer 26D.

The adjustable steering hitch 16D includes one or more steering actuators 32D and a sensor 34D. The actuators 32D mechanically adjust a hitch offset 36D in order to adjust the direction of the implement 12D to minimize a cross track error 18 between the implement 12D and the path 13. The sensor 34D senses the hitch offset 36D relative to the dynamic range or maximum offset 44 of the hitch 16D for providing a hitch offset signal. The actuators 32D are dual hydraulic devices where the maximum offset 44 represents the maximum difference in length between left and right actuators 32D. However, it should be apparent to those skilled in the mechanical arts that the actuators 32D can also be constructed with other mechanical devices using motors, gears, chain drives, pulleys, wires, pneumatic devices, cranks, and the like.

The pivoting hitch 15 and the steering hitch 16D are preferably three point hitches to provide support in three spatial dimensions. The pivoting hitch 15 couples the steering hitch 16D to the powered vehicle 14 through two pivoting arms 75 and a pivoting actuator 77. The pivoting actuator 77 raises the steering hitch 16D and implement 12D off the ground for turning between swaths 11.

When the implement 12D is heavy, actuators may be disposed in the implement 12D for raising the individual cultivator devices 72D. In this case the pivoting actuator 77 may be replaced by a simpler pivoting arm. The steering hitch 16D couples the implement 12D to the pivoting hitch 15 through the actuators 32D and a connecting arm 79. In some cases, an actuator for raising the implement 12D is incorporated into the connecting arm 79. The pivoting hitch 15 and steering hitch 16D may also have other mechanical connections for strengthening the hitches 15 and 16D and otherwise providing for reliable operation.

The farming system 10D is described herein with the powered vehicle 14 towing the implement 12D. However, the vehicle 14 may propel the implement 12D by pushing it or side carrying it. The GPS receiver 24 and/or the dual guidance computer 26D can be carried by the vehicle 14, the pivoting hitch 15, the steering hitch 16D or the implement 12D.

Figure 8:
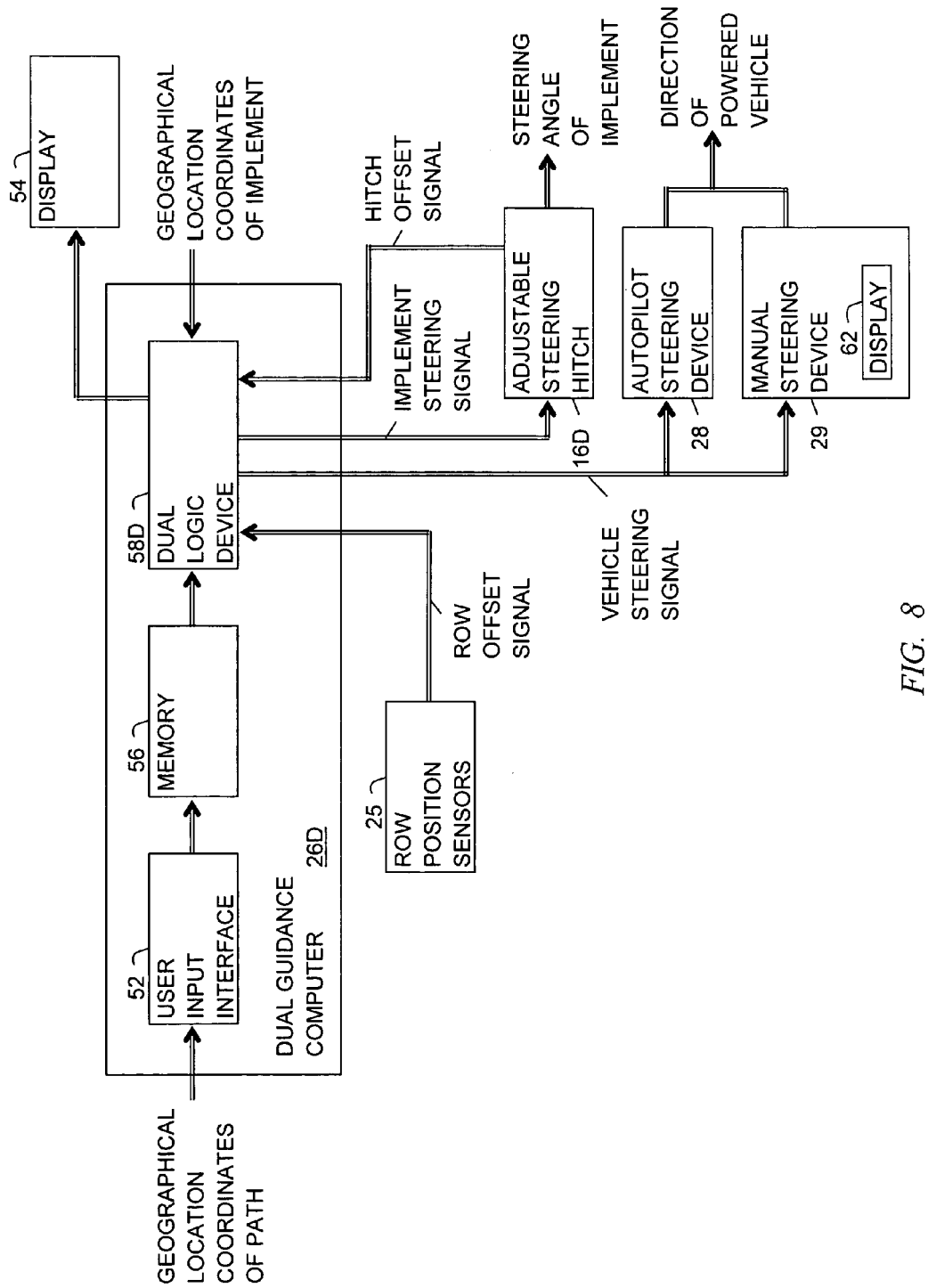
FIG. 8 is a block diagram of a dual guidance computer of the embodiment of FIG. 7.

FIG. 8 is a block diagram of the dual guidance computer 26D. The dual guidance computer 26D has the two functions of providing the implement steering signal for steering the adjustable steering hitch 16D left and right at a relatively rapid rate and simultaneously providing the vehicle steering signal (analogous to the range extent signal described above) for steering the powered vehicle 14 at a relatively slow rate.

The dual guidance computer 26D includes a dual logic device 58D, and the user input interface 52, the display 54 and the memory 56 as described above. In a first variation the dual logic device 58D reads the geographical information for the path 13 from the memory 56 and then compares the path 13 to the GPS-based positions of the implement 12D for estimating the cross track error 18. In a second variation the dual logic device 58D receives the row offsets signals from the row sensors 25 for estimating the cross track error 18 from the relative row position offsets 17. In a third variation the dual logic device 58D combines the use of the GPS positions and row position offsets 17 for estimating the cross track error 18. A correction for the cross track error 18 is then issued by the dual logic device 58D as the implement steering signal to the steering hitch 16D.

The steering hitch 16D uses the implement steering signal as feedback to drive the actuators 32D. When the vehicle 14 is towing, pushing or side carrying the implement 12D, the action of feedback to the actuators 32D guides the implement 12D to follow the path 13 as long as the hitch offset 36D is within its dynamic range of the maximum offset 44.

The dual logic device 58D receives information for the hitch offset 36D in a form that is related to the maximum offset 44 in the hitch offset signal from the sensor 34D. For example, the hitch offset 36D may be represented by a voltage having a dynamic range of plus five volts to minus five volts where plus five volts represents the maximum extent of the offset 36D in one direction and minus five volts represents the maximum extent of the offset 36D in the other direction. The dual logic device 58D processes the information for the hitch offset 36D for providing the vehicle steering signal to the vehicle pilot device 28,29. As described above, the pilot device 28 is an automatic steering device (autopilot) and the pilot device 29 is a manual system for steering the vehicle 14. In either case, the pilot device 28,29 is used to make coarse relatively slow corrections in direction for maintaining the hitch offset 36 within its maximum offset 44.

Figure 9:
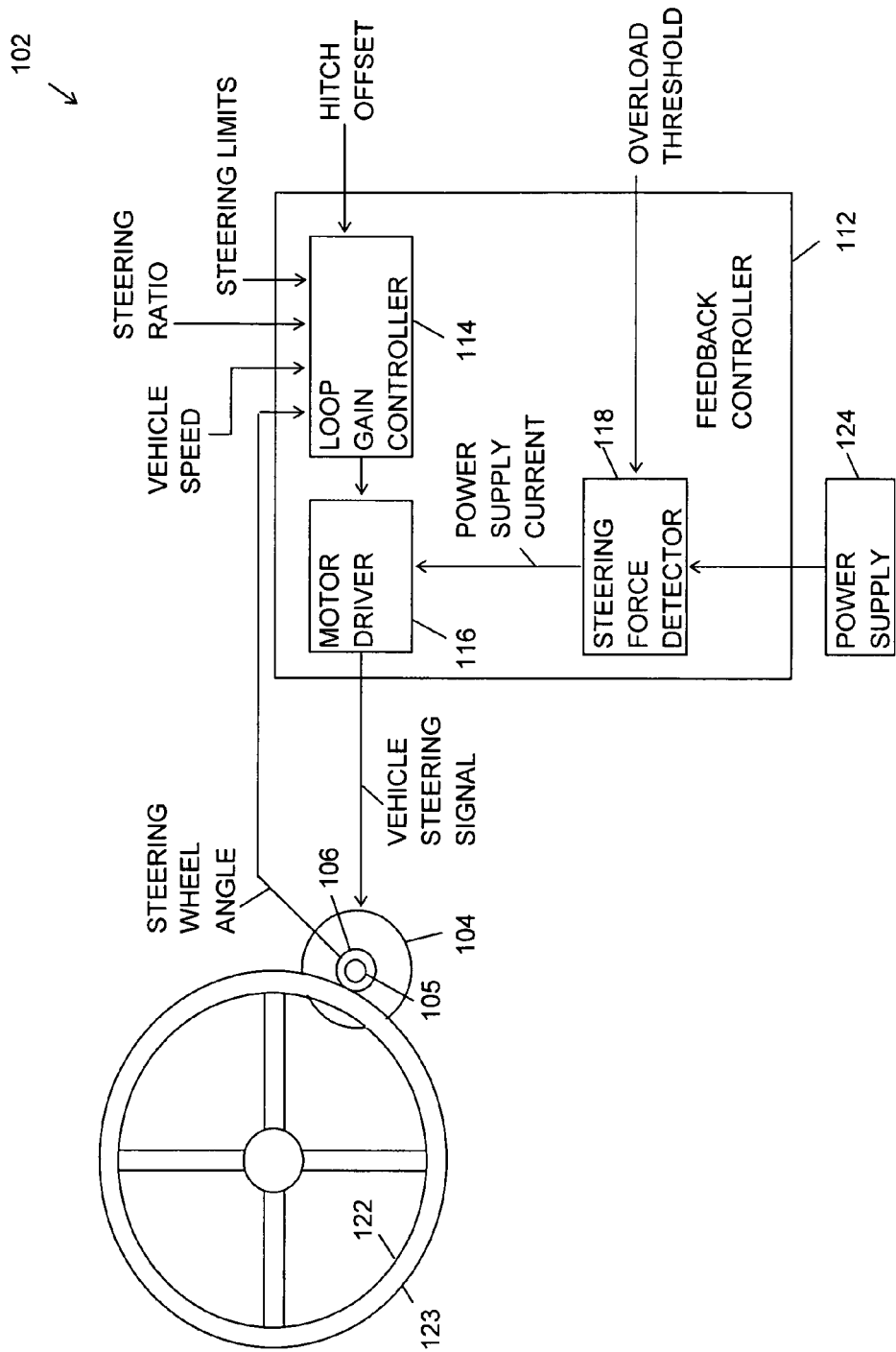
FIG. 9 is a block diagram for an autopilot.

FIG. 9 illustrates an autopilot referred to with a reference number 102. The autopilot 102 includes a motor drive wheel 104 having a shaft encoder 105, a drive wheel 106, and a feedback controller 112. Elements of the autopilot 102 may be included in the vehicle pilot device 28 or the logic device 58D.

The feedback controller 112 includes a loop gain controller 114, a motor driver 116 and a steering force detector 118 to be used with the vehicle 14. The vehicle 14 includes a steering wheel 122 having an outside rim 123, and a power supply 124. The vehicle steering wheel 122 may be operated in a conventional manual manner by a person steering the vehicle 14 by turning or rotating the wheel 122. The power supply 124 may be a conventional vehicle power supply having a rechargeable battery and an alternator or generator.

The loop gain controller 114 uses parametric input variables and embedded equations for providing a control signal based on the hitch offset. The hitch offset is received from an adjustable steering hitch or steerable implement exemplified by the hitches and implements referenced as 16A-B, 12C and 16D. The embedded equations are encoded into a digital signal processor and/or software on a tangible medium. The software may be the form of instructions that are read by a microprocessor. The hitch offset represents a linear or an angular offset. The parametric inputs may include, but are not limited to, the speed of the vehicle; the current rotation angle of the steering wheel; the steering ratio between the angle of the steering wheel 122 and the steering angle of the powered vehicle 14; and the steering limit angle of the powered vehicle 14. The steering wheel rotation angle may be determined by the shaft encoder 105

The motor driver 116 provides the vehicle steering signal in the form of a motor current having a direction and a level controlled b the control signal from the loop gain controller 114. The motor 104 uses the motor current for turning a motor shaft. The motor current is controlled to be a push (source) current source, a pull (sink) current sink in the opposite direction as the push current, or off. For example, the motor current may be zero to plus one ampere for the push current source and zero to minus one ampere for the pull current. For a simple system the motor current may be controlled for three states—zero, source and sink where the source and sink currents have the same level of opposite direction. The motor 104 responds to the motor current by turning the motor shaft in one direction for the push current and the other direction for the pull current. The rotation of the motor shaft rotates the drive wheel 106.

For simplicity, the motor shaft may be the motor armature and the drive wheel 106 may be mounted directly on the motor armature with the same axis of rotation. The drive wheel 106 is disposed so that its rotation turns or rotates the steering wheel 122 with friction between itself and the outside rim 123 of the steering wheel 122. However, gears, belt drive pulleys, and the like can be used. The shaft encoder 105 measures the rotation angle of the steering wheel 122 by monitoring the clockwise and counter-clockwise rotation of the motor shaft. Hall effect or optical sensors together with an up-down counter may be used for making the shaft encoder 105.

Power for the motor current is available to the motor driver 116 from the vehicle power supply 124 through the steering force detector 118. The steering force detector 118 compares the power supply current passed to the motor driver 116 to an overload threshold that includes a level threshold and a time threshold. When the power supply current level exceeds the level threshold for a time exceeding the time threshold, indicative that an external force is holding or turning the steering wheel 122, the detector 118 inhibits the power supply current. Typically, the source of this external force would be the driver of the vehicle 14 trying to steer the vehicle 14 manually.

Several elements of the present disclosure are identified with base reference numbers, such as 10, 12, 16, 26, 32, 34, 36, 44, 46 58, 72, and the like, that are sometimes followed by alphabetical identifiers, such as A, B, C and D. It should be understood elements having the same base reference number and different alphabetical identifiers may usually be substituted for each other for providing variations of the embodiments that are specifically described herein.

Figure 10A:
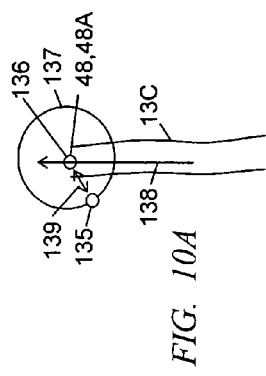
FIGS. 10A and 10B illustrate swath end and swath start positions, respectively, for the turning path of FIG. 10.
Figure 10B:
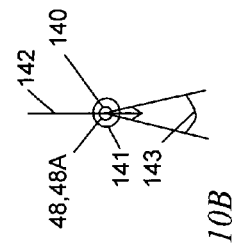
Figure 10:
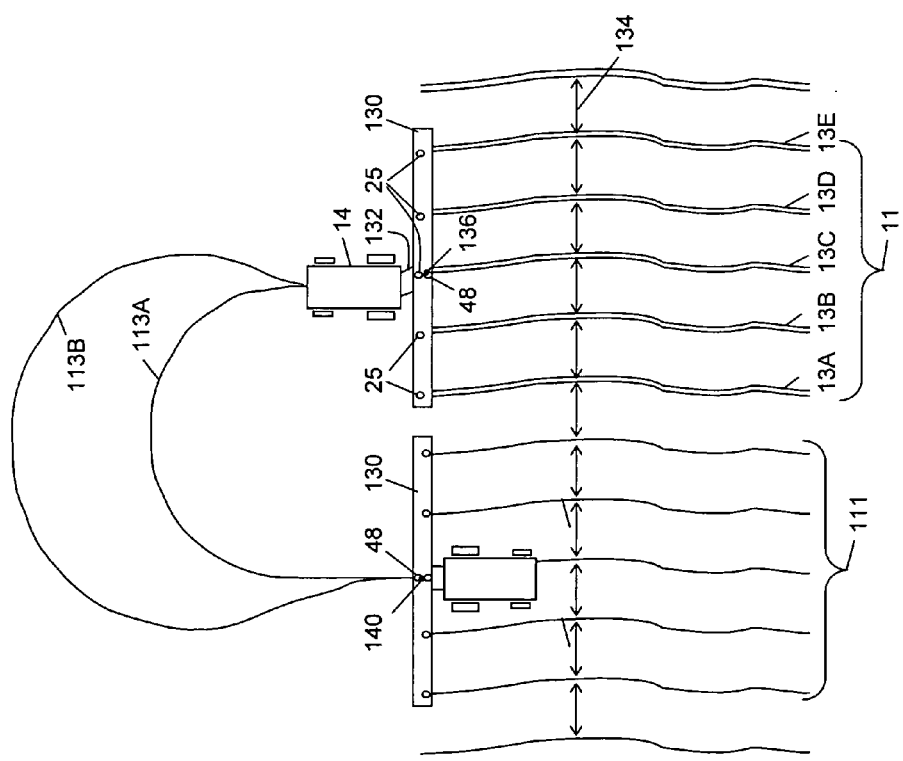
FIG. 10 is an illustration of a turning path for a farm implement between swaths.

FIG. 10 is an illustration of narrow and wide turn paths 113A and 113B for a farm implement 130 pulled by the powered vehicle 14 to make a U-turn from a first swath 11 to a second swath 111. The farm implement 130 may be one of the farm implements 12, 12C or 12D described above. A steering or pivoting hitch 132 connects the implement 130 to the vehicle 14. The hitch 132 may be one of the hitches 16A-C or the combination of hitches 15 and 16D described above. The swath 11 has the rows 13A-E. The rows 13A-E and the rows of the swath 111 have row spacings 134. The farm implement 130 has a row width number for the number of rows that are plowed or otherwise farmed by the implement 130 on one swath. In the illustration the row width number is five. The implement 130 carries the row sensors 25 and the GPS antenna 48. A swath end position 136 marks the end of the first swath 11 and a swath start position 140 marks the start of the second swath 111. The swath end and start positions 136 and 140 may be determined when the farming is planned.

FIG. 10A illustrates relative positions when the implement 130 reaches the swath end position 136. The uncalibrated GPS-based position that is measured by the GPS receiver 24 is shown as a position 135 with respect to the row 13C and the swath end position 136. A physical center position 48A of the implement 130 is shown with respect to the row 13C and the swath end position 136 at the same as the physical position as the GPS antenna 48. Alternatively, the GPS antenna 48 may be carried at another place on the implement 130 and then corrected in the GPS position measurement process to the center position 48A of the implement 130. In any case, the uncalibrated measured GPS position 135 is, in general, different than the position 48 or 48A with respect to the rows 13A-E even when differential GPS is used for determining the GPS position 135.

The swath end threshold zone is shown as zone 137. The direction of the implement 130 is illustrated as direction 138. The swath end position 136 is detected when the measured GPS position 135 enters the swath end threshold zone 137 or the driver of the vehicle 14 observes that the implement 130 is at the swath end position 136 and manually triggers a transition from the swath 11 to the turn path 113A-B. A GPS calibration vector 139 is calculated between the swath end position 136 and the measured GPS position 135 when the swath end position 136 is detected.

FIG. 10B illustrates relative positions when the implement 130 reaches the swath start position 140. The physical center position 48A of the implement 130 is essentially the same as the calibrated GPS position because the GPS positions have been calibrated by the calibration vector 139. A swath start threshold zone is shown as zone 141. The direction of the implement 130 is illustrated as direction 142. A direction threshold range 143 for starting the swath 111 is illustrated as range 143. The swath start threshold zone 141 may be a factor of ten or more smaller than the swath end threshold zone 137.

Figure 11:
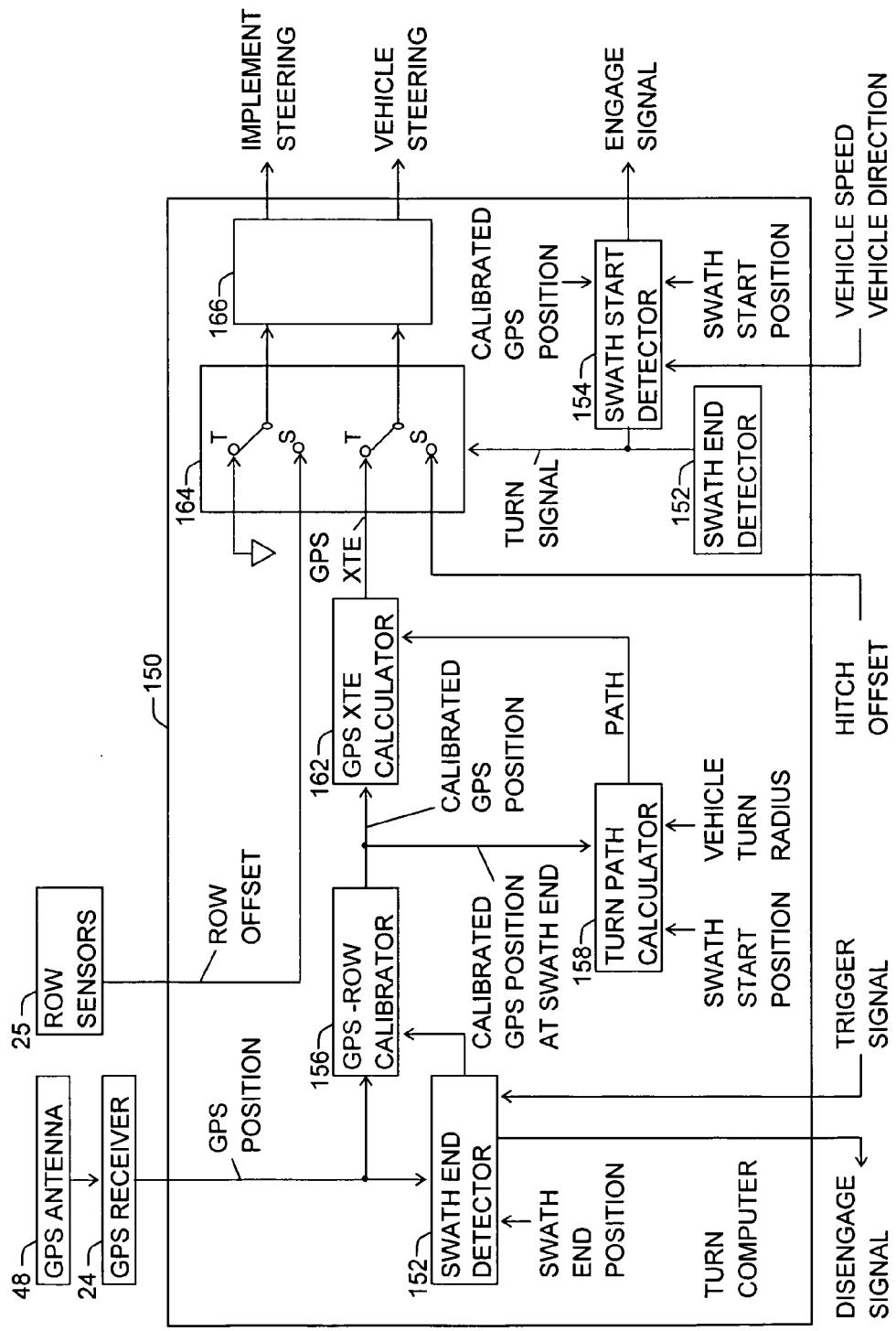
FIG. 11 is a block diagram of a turn computer for calculating the turning path of FIG. 10.

FIG. 11 is a block diagram of a turn computer referred to by a reference number 150. The turn computer 150 includes a swath end detector 152, a swath start detector 154, a GPS-row calibrator 156, a turn path calculator 158, a GPS cross track error (XTE) calculator 162, a turn switch 164, and a guidance computer 166. The guidance computer 166 may be one of the dual guidance computers 26, 26 or 26D described above. The turn guidance 150 computer receives hitch offsets from a pivoting or steering hitch such as the hitches 16A-D described above The row offsets measured by the row sensors 25 are used for guiding the implement 130 along the rows 13A-E of the swath 11 to the swath end position 136. The GPS positions of the implement 130 that are determined by the GPS receiver 24 are, in general, less precise with respect to the rows 13A-E because they are subject to GPS measurement errors and differences between the planned and actual paths of the rows 13A-E. Even so, the GPS positions are sufficiently accurate to determine when the implement 130 is within a selected swath end threshold zone 137 about the swath end position 136.

When the GPS-based position of the implement 130 shows a location that is within the threshold 137, the swath end detector 152 provides a turn signal and a disengage signal. The disengage signal causes the implement 130 to be raised for the turn and to be centered so that the hitch offset is zero. Alternatively, when the driver of the vehicle 14 believes that the implement 130 has reached the swath end position 136, the driver provides a trigger signal to the swath end detector 152 and the swath end detector 152 provides the turn signal and the disengage signal in response to the trigger signal.

The turn signal initiates the GPS-row calibrator 156 to determine the calibration vector 139 that calibrates the GPS positions to the rows 13A-E of the swath 11 when the swath end position 136 is reached by the implement 130. The calibration vector 139 is subtracted from the uncalibrated GPS positions for providing calibrated GPS positions. The turn path calculator 158 uses the swath end position 136 with the turn radius of the vehicle 14 and the swath start position 140 for calculating the path 113A-B. The turn path is normally calculated on-the-fly when the implement 130 reaches the swath end position 136, however, it may be pre-calculated when the rows of the field are laid out. The GPS XTE calculator 162 compares the calibrated GPS positions with the path 113A-B for providing a GPS XTE.

The swath start detector 154 turns off the turn signal and provides an engage signal when the calibrated GPS positions show that the location of the implement 130 is within the swath start threshold zone 141, and the implement speed and the direction 142 are within a speed threshold range and the direction threshold range 143, respectively. The speed and/or the direction 142 may be obtained from GPS measurements or from an electronic compass and vehicle speedometer. The engage signal causes the implement 130 to be lowered to begin the new swath 111. The on-off turn signal is passed to the turn switch 164. The turn switch 164 uses the turn signal to switch between straight (S) and turn (T) positions. The illustration shows the switch 164 in the turn position.

In the straight (S) position the switch 164 passes the hitch offsets to the guidance computer 166 for steering the vehicle 14 and passes the row offsets to the guidance computer 166 for steering the implement 130. In the turn (T) position the switch 164 passes the GPS XTE to the guidance computer 166 for steering the vehicle 14 and inhibits the row, offsets or passes a signal representing row offsets of zero to the guidance computer 166

The guidance computer 166 passes the implement steering information to an implement steering apparatus such as the steering hitches 16A-B and 16D or steerable implement 12C; and passes the vehicle steering information to an autopilot steering device 28, such as the autopilot 102, or a manual steering device 28. The implement 130 is not separately steered during the turn because the implement 130 is centered to the vehicle 14 and the row offsets are inhibited or zeroed. It should be noted that the transition between the vehicle steering based on the hitch offset and vehicle steering based on the GPS XTE that is provided by the turn computer 150 can be automatic and seamless when the implement 130 ends one swath 11, makes a U-turn on the path 113A-B and starts the next swath 111, thereby enabling the autopilot 102 of the vehicle 14 to continuously steer the vehicle 14.

Figure 11A:
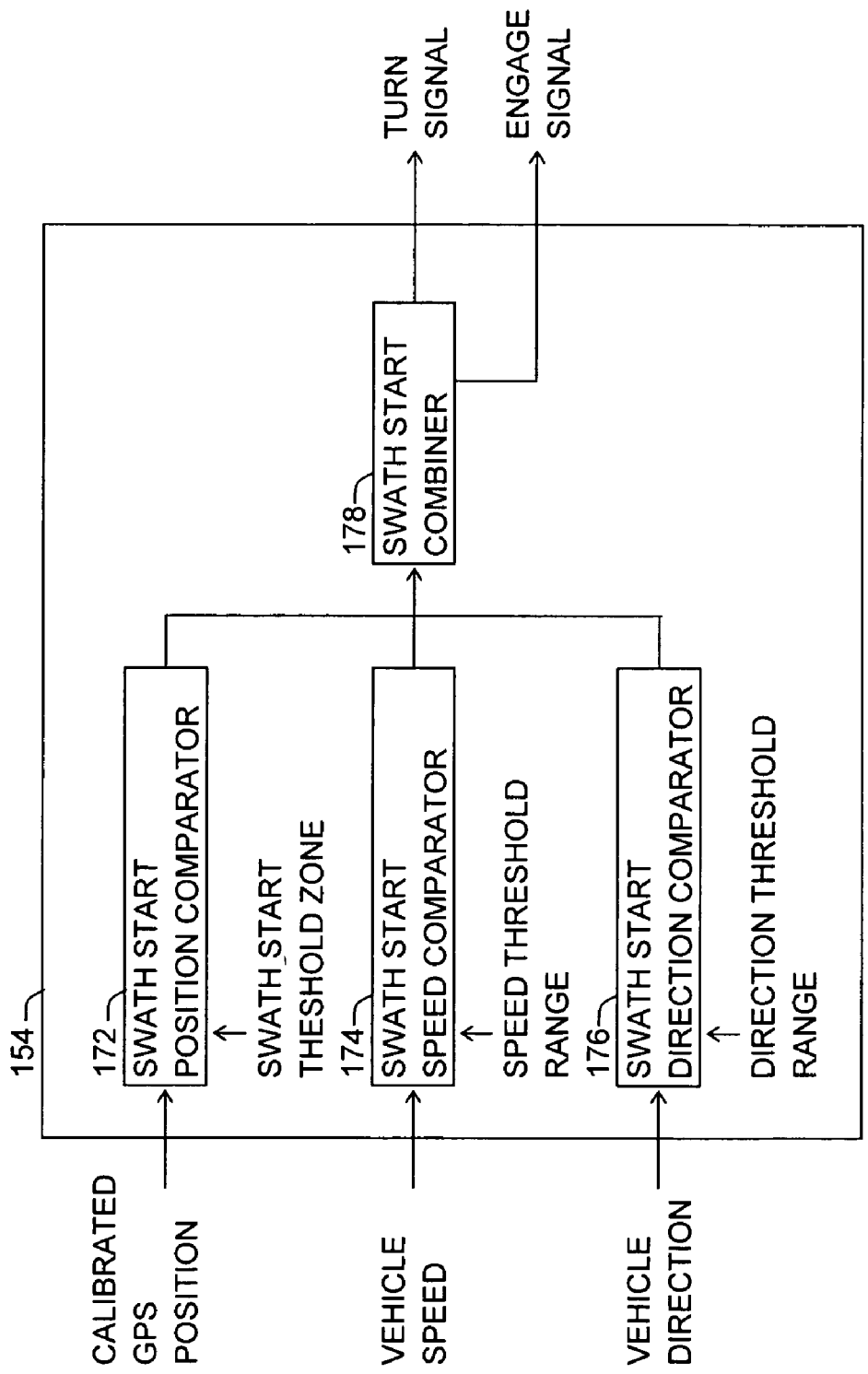
FIG. 11A is a block diagram of a swath start detector of the turn computer of FIG. 11.

FIG. 11A is a block diagram of the swath start detector 154 showing a swath start position comparator 172, a swath start speed comparator 174, a swath start direction comparator 176, and a swath start combiner 178. The swath start position comparator 172 compares the calibrated GPS positions of the implement 130 to the swath start threshold zone 141. The swath start speed comparator 174 compares the vehicle speed to the speed threshold range. The swath start direction comparator 176 compares the direction 142 of the vehicle 14 or the implement 130 to the direction threshold range 143. The swath start combiner 178 turns off the turn signal and provides the engage signal when the calibrated GPS positions show that the location of the implement 130 is within the swath start threshold zone 141, the implement speed is within the speed threshold range and the direction 142 is within the direction threshold range 143, respectively.

Figure 12:
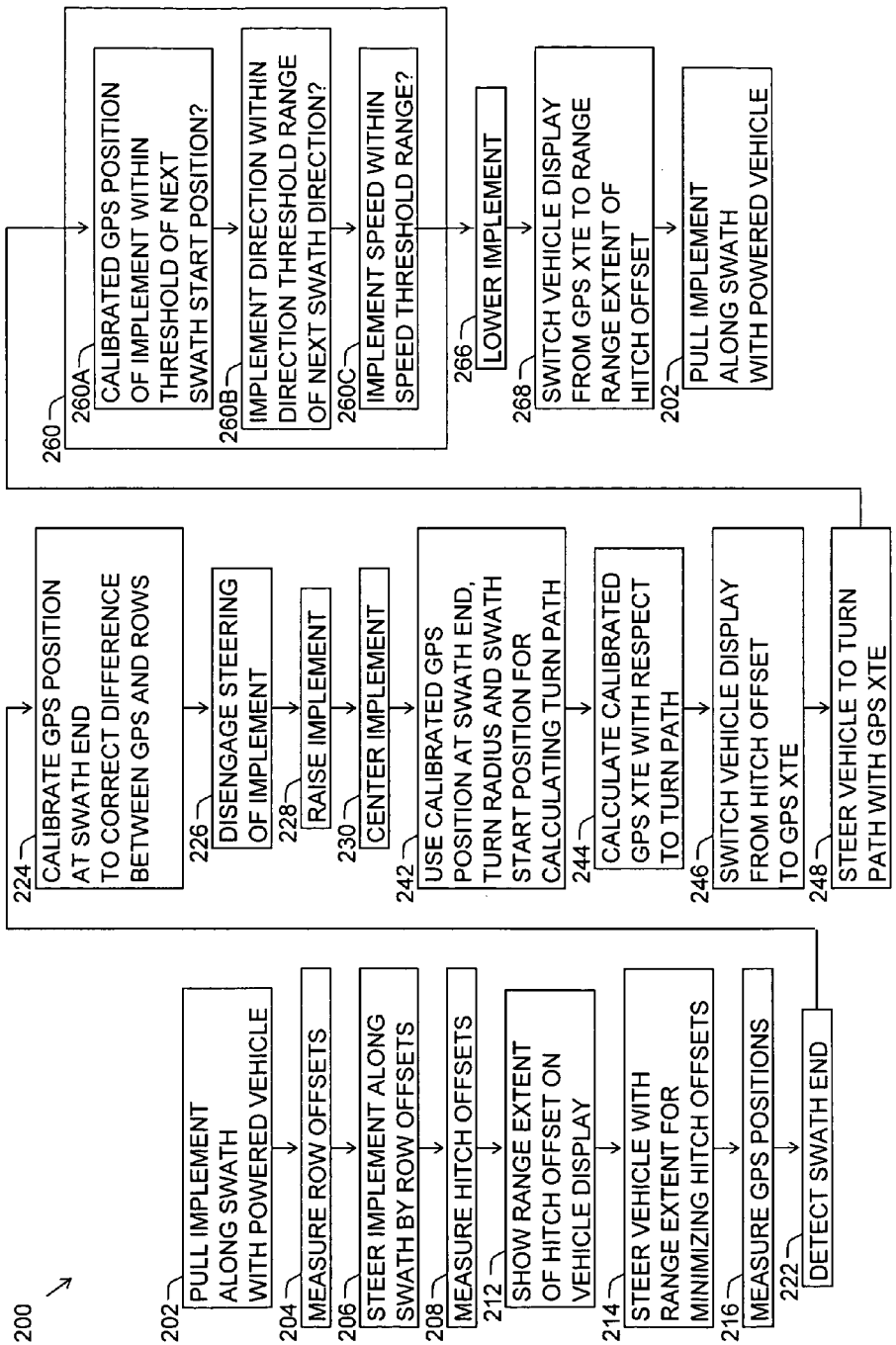
FIG. 12 is flow chart of a method for turning a farm implement.

FIG. 12 is a flow chart of steps for a method for making a U-turn with a farm implement from one swath to the next. The steps of the method may be embodied in a tangible medium 200 containing instructions that may be read by a processor or processors for causing a farming system to carry out the steps of the method. The medium 200 may be one or more digital memory devices such as digital video devices, compact disks, electronic memory chips, random access memory (RAM), read only memory (ROM), hard disks, or the like. The processor may be a device commonly known as a computer or a microprocessor.

The method is a continuous flow of steps where the last step returns to the first step so that any one of the steps may be arbitrarily considered to be the first step. For convenience, the first step is considered to be a step 202 where a farm implement is being pulled or otherwise propelled along a swath by a powered vehicle. In a step 204 when row sensors are available, row offsets are measured between the implement and rows of the swath by row sensors. In a step 206 the implement is steered along the swath by minimizing the measured row offsets or by GPS positions. The steering is accomplished with a steering hitch connecting the vehicle to the implement or with a steerable implement. In a step 208 the hitch offsets for steering the implement are measured. In a step 212 the vehicle display shows the range extents of the hitch offsets. In a step 214 the vehicle is steered for minimizing the hitch offsets either manually or automatically. In a step 216, GPS positions of the implement are measured.

The system detects the end of a swath in a step 222 based upon a trigger signal provided by the driver of the vehicle or closure of the implement GPS positions to within a swath end threshold zone about a planned swath end position. In a step 224 when the swath end is detected, the GPS positions are calibrated to agree with the rows at the swath end position. At the end of the swath, the steering elements of the steering hitch or steerable farm implement are disengaged in a step 226; the implement is raised off the ground in a step 228; and the implement is centered to the vehicle in a step 230.

A U-turn path is calculated in a step 242 from the end position of the just completed swath, the start position for the next swath and the turn radius of the vehicle. In a step 244 a cross track error (XTE) is calculated between the calibrated GPS positions and the calculated turn path. In a step 246 the vehicle display switches from the showing the hitch offset to showing the GPS XTE. In a step 248 the vehicle is steered by an autopilot or a human operator for minimizing the calibrated GPS XTE.

The next swath is started in a step 260 when the position, direction and speed of the implement are within selected thresholds in a farming plan. In a step 260A the calibrated GPS position of the implement comes within a selected distance to the position for the next swath start. In a step 260B the direction of the implement is within a selected direction range of the direction of the next swath. And, in a step 260C the speed of the implement is within a selected speed range for the farming the next swath. In a step 266 the implement is lowered. In a step 268 the vehicle display reverts back to showing the hitch offset. The vehicle propels the implement along the swath in the step 202 and the steps in the method repeat.

In general, although the present disclosure has been described in terms of the certain embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the disclosure.

What is claimed is:

1. A farming apparatus, comprising:
   a guidance computer to steer an implement according to a row offset provided by a row sensor with respect to a row;
   a positioning system to determine geographical positions of said implement;
   a row calibrator to calibrate said geographical positions according to a difference between one of said geographical positions and a planned geographical path of said row; and
   the guidance computer to use said calibration with said geographical positions to steer said vehicle, wherein:
   the guidance computer has a first mode to steer said implement to minimize said row offset provided by said row sensor with respect to said row and to steer said vehicle to minimize a hitch offset between said vehicle and said implement; and a second mode to steer said vehicle to minimize a cross track error between a geographical path and said calibrated geographical positions where said implement is not independently steered.

2. The apparatus of claim 1, wherein:
the guidance computer is configured to use said row offset to steer said implement by controlling an angle steering device built into said implement.

3. The apparatus of claim 2, wherein;
said angle steering device is a coulter.

4. A farming apparatus, comprising:
an implement guidance computer to steer an implement according to a row offset provided by a row sensor with respect to a row while said implement is connected by a hitch to a vehicle;
a vehicle guidance computer to steer said vehicle according to an offset of said hitch; wherein:
the implement and vehicle guidance computers are interconnected to cause said implement to respond more rapidly to changes in said row offset than said vehicle responds to changes in said hitch offset.

5. The apparatus of claim 1, further comprising:
a GPS receiver to determine said geographical positions for a GPS antenna mounted on said implement; and
a row sensor mounted on said implement to sense said row offset with respect to said row.

6. A farming apparatus, comprising:
a guidance computer to steer an implement according to a row offset provided by a row sensor with respect to a row;
a positioning system to determine geographical positions of said implement;
a row calibrator to calibrate said geographical positions according to a difference between one of said geographical positions and a planned geographical path of said row;
the guidance computer to use said calibration with said geographical positions to steer said vehicle;
a turn path calculator to use a geographical swath end position, a turn radius of said vehicle, and a geographical swath start position to calculate a turn path; and wherein:
the guidance computer is configured to use said calibrated geographical positions to steer said vehicle along said turn path.

7. A farming apparatus, comprising:
a swath start position comparator to compare a geographical position to a swath start threshold zone;
a swath start speed comparator to compare a speed to a speed threshold range;
a swath start direction comparator to compare a direction with a direction threshold range; and
a swath start combiner to initiate a swath when said geographical position is within said swath start threshold zone, said speed is within said speed threshold range and said direction is within said direction threshold range.

8. A method for farming, comprising:
steering an implement according to a row offset provided by a row sensor with respect to a row;
determining geographical positions of said implement;
calibrating said geographical positions according to a difference between one of said geographical positions and a planned geographical path of said row;
using said calibrated geographical positions for steering said vehicle;
steering said implement includes a first mode for steering said implement by minimizing said row offset provided by said row sensor with respect to said row and a second mode where said implement is not independently steered; and
steering said vehicle includes said first mode for steering said vehicle by minimizing a hitch offset between said vehicle and said implement and said second mode for steering said vehicle by minimizing a cross track error between a geographical path and said calibrated geographical positions.

9. The method of claim 8, wherein:
the step of steering said implement includes controlling an angle steering device built into said implement.

10. The method of claim 9, wherein;
said angle steering device is a coulter.

11. A method for farming, comprising:
steering a vehicle according to an offset of a hitch connecting said vehicle to an implement;
steering said implement according to a row offset provided by a row sensor with respect to a row; and wherein:
the step of steering said implement further includes causing said implement to respond more rapidly to changes in said row offset than said vehicle responds to changes in said hitch offset.

12. The method of claim 8, wherein:
said geographical positions are GPS positions for a GPS antenna mounted on said implement; and
said row offset is sensed by a row sensor mounted on said implement.

13. A method for farming, comprising:
steering an implement according to a row offset provided by a row sensor with respect to a row;
determining geographical positions of said implement;
calibrating said geographical positions according to a difference between one of said geographical positions and a planned geographical path of said row;
using said calibrated geographical positions for steering said vehicle;
calculating a turn path based on a geographical swath end position, a turn radius of said vehicle, and a geographical swath start position; and wherein:
the step of steering said vehicle includes using said calibrated geographical positions for steering said vehicle along said turn path.

14. A method for farming, comprising:
comparing a geographical position to a swath start threshold zone;
comparing a speed to a speed threshold range;
comparing a direction with a direction threshold range, wherein said steps of comparing are performed by a swath start detector in a farming apparatus; and
lowering an implement for initiating a swath when said geographical position is within said swath start threshold zone, said speed is within said speed threshold range and said direction is within said direction threshold range.

15. A non-transitory computer readable medium containing a set of instructions for causing a processor to carry out the following steps:
steering an implement according to a row offset provided by a row sensor with respect to a row;
determining geographical positions of said implement;
calibrating said geographical positions according to a difference between one of said geographical positions and a planned geographical path of said row;
using said calibrated geographical positions for steering said vehicle;
steering said implement includes a first mode for steering said implement by minimizing said row offset provided by said row sensor with respect to said row and a second mode where said implement is not independently steered; and steering said vehicle includes said first mode for steering said vehicle by minimizing a hitch offset between said vehicle and said implement and said second mode for steering said vehicle by minimizing a cross track error between a geographical path and said calibrated geographical positions.

16. The medium of claim 15, wherein:

the step of steering said implement includes controlling an angle steering device built into said implement.

17. The medium of claim 16, wherein;

said steering device is a coulter.

18. A non-transitory computer readable medium containing a set of instructions for causing a processor to carry out the following steps:

steering a vehicle according to an offset of a hitch connecting said vehicle to an implement;

steering said implement according to a row offset provided by a row sensor with respect to a row; and wherein:

the step of steering said implement includes causing said implement to respond more rapidly to changes in said row offset than said vehicle responds to changes in said hitch offset.

19. The medium of claim 15, wherein:

said geographical positions are GPS positions for a GPS antenna mounted on said implement; and said row offset is sensed by a row sensor mounted on said implement.

20. A non-transitory computer readable medium containing a set of instructions for causing a processor to carry out the following steps:

steering an implement according to a row offset provided by a row sensor with respect to a row;

determining geographical positions of said implement;

calibrating said geographical positions according to a difference between one of said geographical positions and a planned geographical path of said row;

using said calibrated geographical positions for steering said vehicle;

calculating a turn path based on a geographical swath end position, a turn radius of said vehicle, and a geographical swath start position; and wherein:

the step of steering said vehicle includes using said calibrated geographical positions for steering said vehicle along said turn path.

21. A non-transitory computer readable medium containing a set of instructions for causing a processor to carry out the following steps:

comparing a geographical position to a swath start threshold zone;

comparing a speed to a speed threshold range;

comparing a direction with a direction threshold range; and initiating a swath when said geographical position is within said swath start threshold zone, said speed is within said speed threshold range and said direction is within said direction threshold range.

* * * * *